US007407250B2

(12) United States Patent
Jones et al.

(10) Patent No.: US 7,407,250 B2
(45) Date of Patent: Aug. 5, 2008

(54) APPARATUS, SYSTEM, AND METHOD FOR MULTI-DIMENSIONAL REGISTRATION PRINTING

(75) Inventors: Mark R. Jones, Seffner, FL (US); Gerd B. Peters-Grellenberg, Homewood, IL (US)

(73) Assignee: Pixal Wizard International, Inc, Seffner, FL (US)

( * ) Notice: Subject to any disclaimer, the term of this patent is extended or adjusted under 35 U.S.C. 154(b) by 241 days.

(21) Appl. No.: 11/061,334

(22) Filed: Feb. 17, 2005

(65) Prior Publication Data

US 2005/0179721 A1 Aug. 18, 2005

Related U.S. Application Data

(60) Provisional application No. 60/545,407, filed on Feb. 18, 2004.

(51) Int. Cl.

| | |
|---|---|
| ***B41J 29/38*** | (2006.01) |
| ***B41J 2/01*** | (2006.01) |
| ***B41J 3/407*** | (2006.01) |
| ***B41J 2/315*** | (2006.01) |
| ***B41J 2/435*** | (2006.01) |
| ***B41M 5/00*** | (2006.01) |
| ***G01D 15/10*** | (2006.01) |

(52) U.S. Cl. ......................... 347/16; 347/101; 347/104; 347/105; 347/106; 347/221; 347/262

(58) Field of Classification Search ................. 347/174, 347/16, 101, 104–106, 221, 262
See application file for complete search history.

(56) References Cited

U.S. PATENT DOCUMENTS

| | | | | |
|---|---|---|---|---|
| 5,156,938 | A * | 10/1992 | Foley et al. | 430/200 |
| 5,607,762 | A * | 3/1997 | Albert et al. | 428/321.3 |
| 5,649,774 | A * | 7/1997 | Harding et al. | 400/225 |
| 5,766,324 | A * | 6/1998 | Ikegaya et al. | 106/31.15 |
| 5,832,819 | A | 11/1998 | Widman | 101/34 |
| 5,894,069 | A * | 4/1999 | Wen et al. | 503/227 |
| 5,935,709 | A * | 8/1999 | Yoshida | 428/32.86 |
| 6,069,680 | A | 5/2000 | Kessler et al. | 355/22 |
| 6,226,020 | B1 * | 5/2001 | Schuster et al. | 347/176 |
| 6,538,767 | B1 | 3/2003 | Over et al. | 358/1.18 |
| 6,630,998 | B1 * | 10/2003 | Welchman et al. | 356/394 |
| 6,923,115 | B1 * | 8/2005 | Litscher et al. | 101/35 |
| 2002/0162472 | A1 | 11/2002 | Liguori et al. | 101/487 |
| 2003/0025781 | A1 * | 2/2003 | Honma et al. | 347/213 |

* cited by examiner

*Primary Examiner*—Matthew Luu
*Assistant Examiner*—Kainoa B Wright
(74) *Attorney, Agent, or Firm*—Kunzler & McKenzie

(57) ABSTRACT

An apparatus, system, and method are disclosed for multi-dimensional registration printing. One embodiment of the apparatus includes an image module, a print module, and an object registration module. The image module stores a digital representation of an image. The print module prints the image on a multi-dimensional surface of an object. The object registration module controls a multi-dimensional registration of the multi-dimensional surface of the object in proximity to a print head in accordance with the image. The printing system may use a print ribbon that includes an infrared absorbent, a resin, or both.

36 Claims, 16 Drawing Sheets

APPARATUS, SYSTEM, AND METHOD FOR MULTI-DIMENSIONAL REGISTRATION PRINTING

CROSS REFERENCES TO RELATED APPLICATIONS

This application claims the benefit of priority of U.S. Provisional Patent Application No. 60/545,407, entitled "APPARATUS, SYSTEM, AND METHOF FOR MULTI-DIMENSIONAL REGISTRATION PRINTING" and filed on Feb. 18, 2004 for Mark R. Jones and Gerd B. Peters-Grellenberg, which is incorporated herein by reference.

BACKGROUND OF THE INVENTION

1. Field of the Invention

This invention relates to printing and more particularly relates to printing an image on a multi-dimensional surface of an object.

2. Description of the Related Art

Logos and text are often affixed to objects, especially sporting equipment and paraphernalia. Conventional printing technologies for printing logos, graphics, texts, and other images on objects include inkjet printing and indirect transfer. Inkjet printing sprays liquid ink dots from an ink cartridge onto the objects. Inkjet printing has a relatively low resolution and is less durable over time than other printing technologies.

Indirect transfer conventionally includes printing the image on a transfer medium and then pressing the image from the transfer medium onto the object. However, the quality of indirect image transfer is significantly limited by the difficulty of transferring the image from the transfer medium to the object, especially if the transfer medium has a different contour than the object. Indirect image transfer technologies also suffer from the labor-intensive process to put the image on the object.

Conventional technologies also have many disadvantages with regard to delivery of the objects having images printed thereon to customers. These disadvantages are particularly apparent when custom images are printed on the objects. In order to be economically feasible, orders for such custom printing jobs typically require extremely large quantities or may be subject to extremely high development and production costs. Additionally, convention printing and image transfer technologies take a relatively long time from conception to delivery because of the labor-intensive development and production.

From the foregoing discussion, it should be apparent that a need exists for an apparatus, system, and method that overcome the limitations of conventional image printing technologies. Beneficially, such an apparatus, system, and method would be faster and simpler than conventional technologies.

SUMMARY OF THE INVENTION

The several embodiments of the present invention have been developed in response to the present state of the art, and in particular, in response to the problems and needs in the art that have not yet been fully solved by conventional printing technologies. Accordingly, the present invention has been developed to provide an apparatus, system, and method for multi-dimensional registration printing that overcome many or all of the above-discussed shortcomings in the art. Embodiments of this invention facilitate printing an image on a surface of an object.

In one embodiment, the apparatus to facilitate registration printing on a multi-dimensional surface is provided with a logic unit containing a plurality of modules configured to functionally execute the necessary operations for multi-dimensional registration printing. These modules in the described embodiments include an image module, a print module, and an object module. These modules also include a print head module, a media control module, an image concatenation module, an orientation module, a station control module, a verification module, a sensor module, and a delivery module. Further embodiments also may include an intensity module and a time module.

In one embodiment, the image module stores a digital representation of an image. In one embodiment, the print module prints the image on a multi-dimensional surface of an object. The object module controls a multi-dimensional registration of the multi-dimensional surface of the object in proximity to a print head in accordance with the image.

In one embodiment, the print head module controls a multi-dimensional registration of a print head in proximity to the multi-dimensional surface in accordance with the image. The media control module controls a multi-dimensional registration of a print media in proximity to at least one of the print head and the multi-dimensional surface of the object. In another embodiment, the image concatenation module concatenates the digital representation of the image with a second digital representation of a second image.

In one embodiment, the orientation module orients the object with respect to a physical characteristic of the object. The station control module moves the object between a printing station and another object handling station. The verification module identifies a verification mark applied to the object. The sensor module controls a sensor to facilitate handling of the object. The delivery module delivers the object to a delivery station after the image is printed on the multi-dimensional surface of the object.

The intensity module controls an intensity of a laser signal from a laser print head. The time module controls a duration of the laser signal from the laser print head.

Another apparatus is presented in the form of a print ribbon. In one embodiment, the apparatus includes a dye carrier medium, a dye, a resin, and an infrared (IR) absorbent. The dye, resin, and IR absorbent are applied to the dye carrier medium. The resin facilitates adhesion of the dye to a printing surface of an object. The IR absorbent reacts to an IR source to transfer the dye from the dye carrier medium to the printing surface.

In a further embodiment, the IR absorbent absorbs heat in response to an IR signal from the IR source. In one embodiment, the IR signal is within an IR wavelength range of approximately between 750 nm and 1 mm. In a further embodiment, the resin facilitates protection of the dye in response to application of the dye to the object. In certain embodiments, the print ribbon may be configured as a panelized, polychromatic print ribbon or as a monochromatic print ribbon.

Yet another apparatus is presented in the form of a print ribbon. In one embodiment, the apparatus includes a dye carrier medium, a dye, and an infrared (IR) absorbent. The IR absorbent is reactive to an IR signal having a wavelength of at least approximately 850 nm. In a further embodiment, the IR absorbent is reactive to an IR signal having a wavelength of at least approximately 900 nm. In another embodiment, the IR absorbent has an absorbance of approximately 0.5 within a wavelength range of approximately between 900 nm and 1050 nm. In a further embodiment, the IR absorbent has a maximum absorbance within a wavelength range of approximately between 975 nm and 1000 nm.

A system of the present invention is also presented to facilitate registration printing on a multi-dimensional surface of an object. The system may be embodied in a printing system having a print ribbon cartridge, an object holding device, and a registration device. The print ribbon cartridge has a print ribbon and is coupled to a registration mount. The object holding device holds the object having the print surface. In one embodiment, the registration device is coupled to the registration mount and the object holding device and moves the registration mount and the object holding device to orient the print ribbon cartridge and the object holding device in a print position with respect to a print head.

In another embodiment of the system, the print head is a laser print head that emits a laser signal having approximately an IR wavelength. The system also may include an intensity module and/or a time module, as described above with respect to the apparatus. In another embodiment, the system also includes a ribbon extension device to extend the print ribbon away from the print ribbon cartridge and to orient the print ribbon approximately in contact with the print surface of the object. The ribbon extension device may be a linear extension arm to extend the ribbon roller away from the print ribbon cartridge along a substantially linear path. Alternatively, the ribbon extension device may be a radial extension arm to extend the ribbon roller away from the print ribbon cartridge along a substantially radial path.

In another embodiment, the system may include an object orientation device to identify the print surface of the object and to orient the object so that the print surface of the object, when held in close proximity to the print head by the object holding device, is substantially oriented toward the print head. The object orientation device may include one or more sensors.

Another embodiment of a system is presented to facilitate thermal transfer printing on a multi-dimensional surface. In one embodiment, the system includes a print ribbon cartridge having a print ribbon with a dye applied thereto and a print head to directly transfer the dye from the print ribbon to a multi-dimensional surface of an object. In another embodiment, the system includes an IR absorbent applied to the print ribbon. In another embodiment, the system includes an IR laser to apply an IR signal to the print ribbon. In another embodiment, the system includes a resin applied to the print ribbon.

Another embodiment of a system is presented to print on a surface of an object. The system includes a print ribbon cartridge, an IR laser, and an IR absorbent. The print ribbon cartridge has a print ribbon with a dye applied thereto. The IR laser having a wavelength of at least approximately 850 nm. The IR absorbent is applied to the print ribbon and is reactive to the IR laser to transfer the dye directly from the print ribbon to a surface of an object in response to incidence of an IR signal from the IR laser on the print ribbon.

In one embodiment, the printing system prints the dye on the surface of a multi-dimensional object. In another embodiment, the printing system prints the dye on a sheet of paper. In another embodiment, the system includes a resin applied to the print ribbon. In another embodiment, a receiving layer may be applied to the surface of the object.

Another embodiment of a system is embodied in an automated kiosk. The kiosk includes a selection module, a print module, and a registration module. In one embodiment, the selection module allows a customer to select a multi-dimensional object for purchase. In this embodiment, the print module prints an image on a surface of the object. The registration module is preferably configured to control a multi-dimensional registration of either a print head or the multi-dimensional object in proximity to the other in accordance with the image.

In another embodiment, the system also may include a kiosk lockout module, an image input module, an image load module, a text input module, and/or a display module. In one embodiment, the kiosk lockout module locks the automated kiosk system in an inoperable state in response to a lockout control signal. In one embodiment, the image input module accesses an image file that is stored remotely from the automated kiosk system. In one embodiment, the image load module accesses an image file that is stored locally on the automated kiosk system. In one embodiment, the text input module recognizes text input from a user and includes the text input in the image in response to an insertion operation. In one embodiment, the display module displays the image to a user for verification before the image is printed on the surface.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
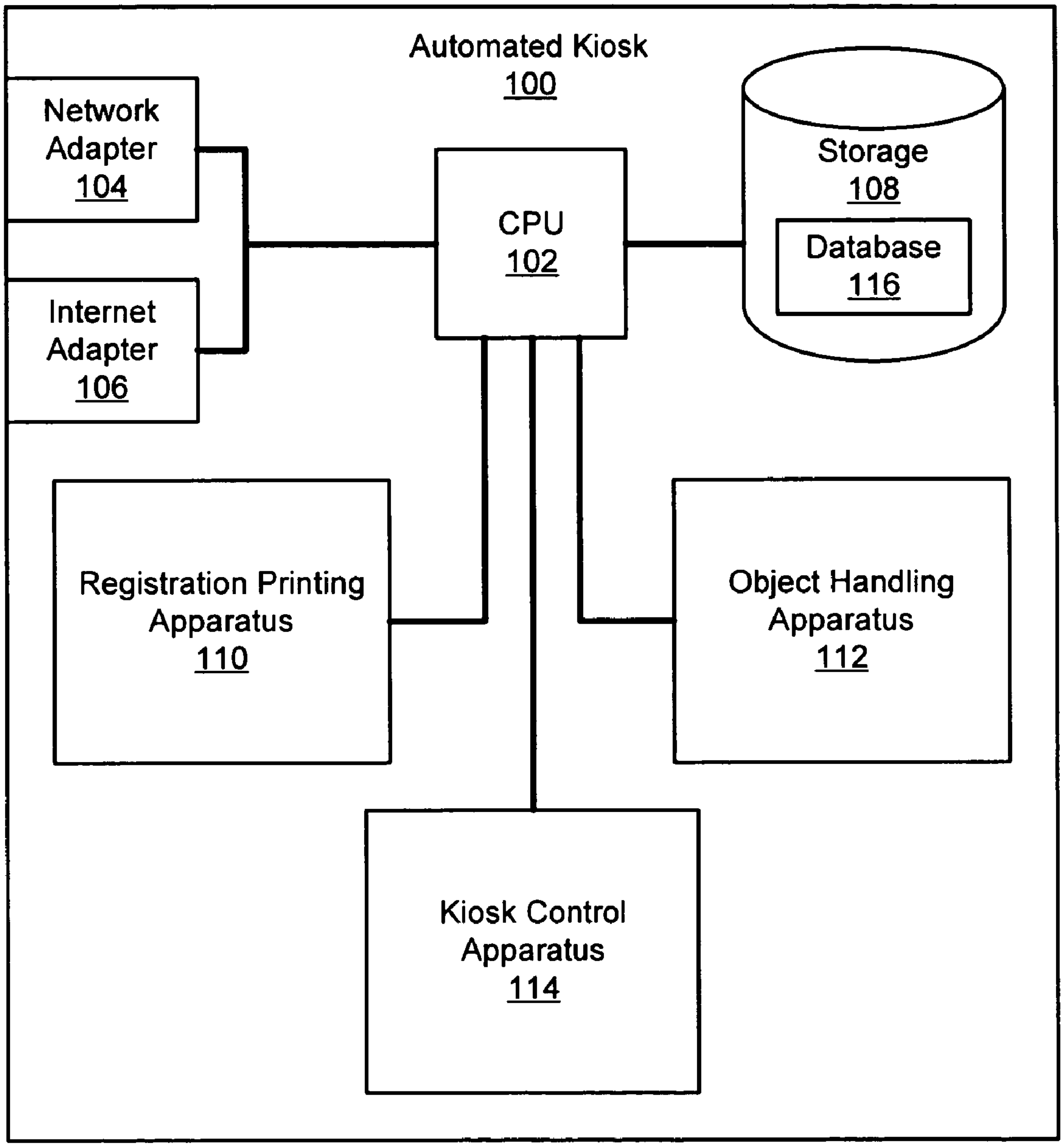
FIG. 1 is a schematic block diagram illustrating one embodiment of an automated kiosk.

FIG. 1 depicts an automated kiosk 100 that may incorporate one embodiment of the present invention. The illustrated automated kiosk 100 includes a central processing unit 102, a network adapter 104, an internet adapter 106, a local storage device 108, a registration printing apparatus 110, an object handling apparatus 112, and a kiosk control apparatus 114. In one embodiment, the local storage device 108 may further include a database 116. Furthermore, certain embodiments may be incorporated into a desktop printer instead of or in addition to the illustrated automated kiosk 100.

Although not depicted in FIG. 1, the automated kiosk 100 also may comprise additional hardware and software that is typical in a user computer, desktop computer, network client, or similar computing device. For example, another embodiment of the automated kiosk 100 may include a local memory device, a user interface, and so forth. In a further embodiment, the automated kiosk 100 may exclude the network adapter 104 or the internet adapter 106.

The CPU 102 is configured generally to execute operations within the automated kiosk 100. The network adapter 104 is configured, in one embodiment, to allow the automated kiosk to connect to a network, including a LAN, WAN, wireless, peer-to-peer, or another type of network. The network adapter 104 also may facilitate communications between the automated kiosk and a network server (not shown). For example, the network adapter 104 may be an Ethernet interface, a Fibre Channel interface, an 802.11x wireless interface, a Bluetooth interface, or another type of network interface. The internet adapter 106 is configured, in one embodiment, to allow a remote user to access the automated kiosk 100 via the internet. The internet adapter 106 also may facilitate communications between the automated kiosk 100 and a remote server, a remote storage device, another kiosk, and so forth.

The database 116 on the local storage device 108 is configured, in one embodiment, to store a plurality of graphics files. The automated kiosk 100 may be configured to print one or more of the plurality of graphics files in the database 116 on a multi-dimensional surface of an object. The automated kiosk 100 also may be configured, in a further embodiment, to print one or more graphics from other digital input sources, including cameras, scanners, and other digital media. One exemplary method of printing on a multi-dimensional surface is described in more detail with reference to FIG. 11.

The registration printing apparatus 110 is configured, in one embodiment, to facilitate multi-dimensional registration printing on a multi-dimensional surface of an object. One embodiment of the registration printing apparatus 110 is described in more detail with reference to FIG. 2.

The object handling apparatus 112, in one embodiment, is configured to manipulate the location and orientation of the object during multi-dimensional registration printing. In a further embodiment, the object handling apparatus 112 maybe configured to handle the object prior to and subsequent to the registration printing. For example, the object handling apparatus 112 may facilitate removing the object from an inventory location, handling the object for pre-printing treatment, handling the object for post-printing treatment, and delivering the object to a customer or to a delivery station. One embodiment of the object handling apparatus 114 is described in more detail with reference to FIG. 3.

The kiosk control apparatus 114 is configured, in one embodiment, to control various functions and activities of the automated kiosk 100. One embodiment of the kiosk control apparatus 114 is described in more detail with reference to FIG. 4.

Figure 2:
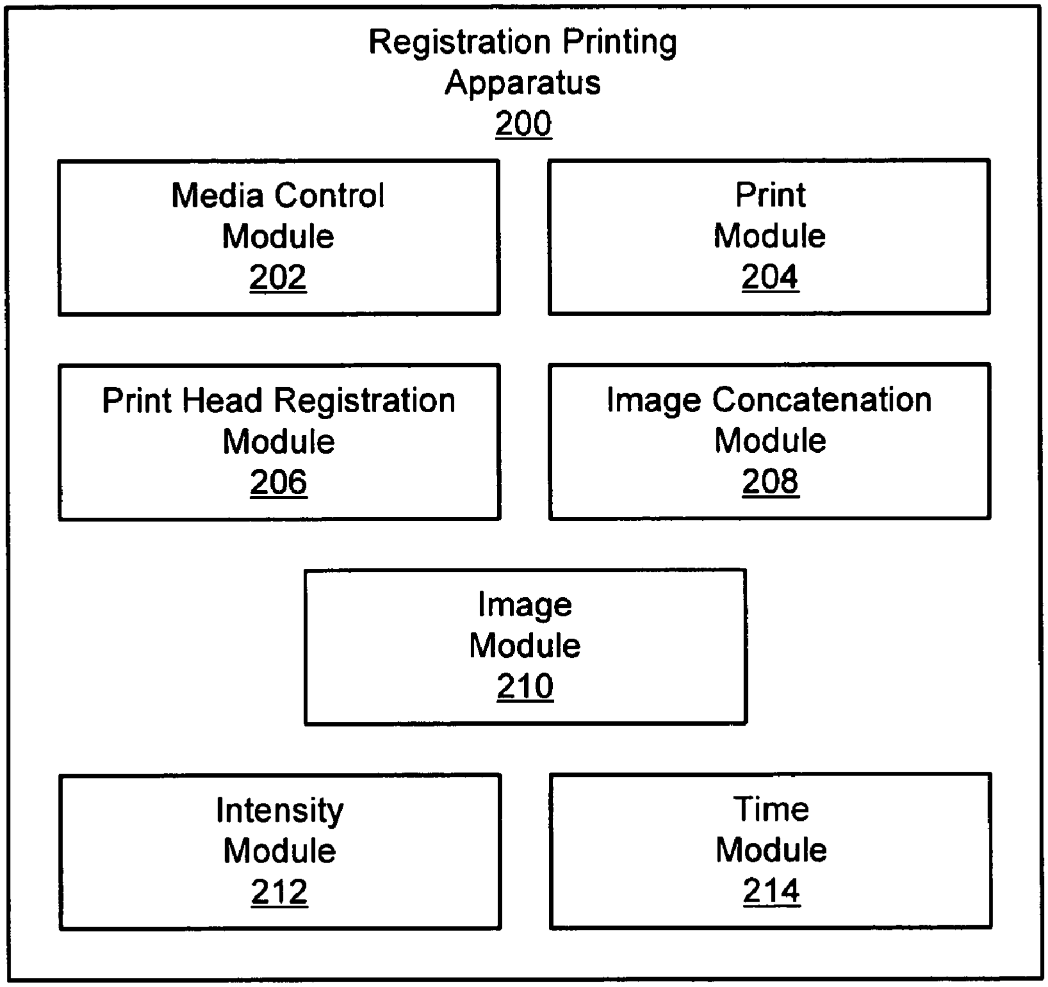
FIG. 2 is a schematic block diagram illustrating one embodiment of a registration printing apparatus.

FIG. 2 depicts one embodiment of a registration printing apparatus 200 that is given by way of example of the registration printing apparatus 110 of FIG. 1. The illustrated registration printing apparatus 200 includes a media control module 202, a print module 204, a print head registration module 206, an image concatenation module 208, and an image module 210.

The media control module 202 is configured, in one embodiment, to control the location of the print media in relation to the object and the print head. For example, the media control module 202 may control the location of a patch-coded print ribbon before, during, and after printing a graphic on a multi-dimensional surface of an object. One example of a patch-coded print ribbon is described in U.S. Pat. No. 4,642,655, issued on Feb. 10, 1987 to Sparer et al., entitled "Color-indexed dye frames in thermal printers." In an alternate embodiment, the media control module 202 may control a print ribbon that is not patch-coded. Another embodiment of a print ribbon is shown and described in more detail with reference to FIG. 21.

In one embodiment, the media control module 202 is configured to advance the print ribbon, for example, to use a specific color. In a further embodiment, the media control module 202 is configured to laterally move the ribbon in a direction substantially perpendicular to the tangential plane of the multi-dimensional surface at the location of the pixel to be printed. In other words, the media control module 202 may move the print media away from the print surface or, alternately, toward the print surface. In one embodiment, the media control module 202 is configured to move the print media so that it contacts the print surface of the object at least at the location where a single pixel is to be printed. Although the media control module 202 is described as it relates to using patch-coded print media, the media control module 202 may be further configured to control another type of print media instead of or in addition to patch-coded print media.

The print module 204, in one embodiment, is configured to print an image or graphic on the multi-dimensional surface of an object. In one embodiment, an image or graphic is not limited to any specific type of content; it may include a picture, an alphanumeric character, a symbol, a color, text, codes, digitized illustrations, or any other type of graphic. The print module 204 operates in conjunction with the other modules 202, 206, 208 of the registration printing apparatus 200. For example, the print module 204 may be configured to print one pixel each time the print media 202 is moved and the object is oriented so that the desired print location is in line with the print media and the print head. In this way, the print module 204 may print one or more images, characters, symbols, colors, etc. on the multi-dimensional surface of an object.

The print head registration module 206 of the registration printing apparatus 200 may be configured to control the registration of the print head in relation to the multi-dimensional surface of the object, as well as the print media. In one embodiment, the print head registration module 206 may laterally move the print head toward or away from the print media and the object. In a further embodiment, the print head registration module 206 also may move the print head in one or more directions that are substantially parallel to the tangential plane of the print surface, i.e. up and down, side-to side, or a combination of these. In another embodiment, the print head registration module 206 may maintain the print head in a static position. In another embodiment, the print head registration module 206 may manipulate the object in conjunction with the print ribbon.

Figure 5:
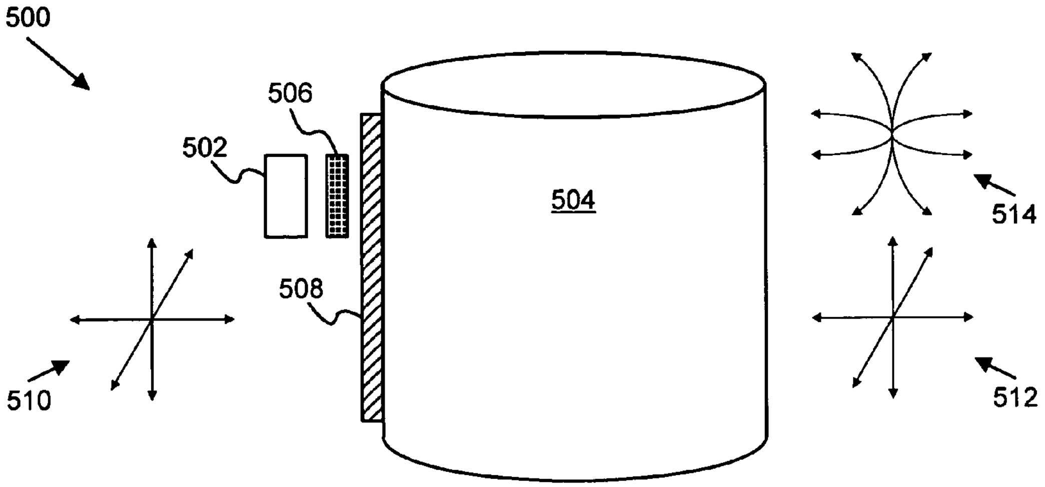
FIG. 5 is a schematic diagram illustrating one embodiment of a printing system.

In a further embodiment, the print head registration module 206 additionally may rotate the print head, for example, to maintain a perpendicular orientation relative to the curvature of a rounded surface as the print head is moved "around" a portion of the object's surface. These and other ways in which the print head registration module 206 may move the print head in relation to an object are depicted in FIG. 5.

In order to facilitate proper registration of the print head, including maintaining a specific distance between the print head and the print media during printing, the print head registration module 206 may include one or more sensors that are configured to sense and calculate a relative distance between the sensor and another object, such as the print media, or between the print head and another object.

The image concatenation module 208, in one embodiment, is configured to overlay at least a portion of one image over another to form a concatenated image to be printed on the multi-dimensional surface of the object. For example, the image concatenation module 208 may incorporate a user image into a stock background image (that may be stored in the database 116 to create a concatenated image.

The image module 210, in one embodiment, stores a digital representation of an image. For example the image module 210 may maintain the database 116 on the electronic storage device 108. In another embodiment, the image module 210 also may access one or more images on the electronic storage device 108.

The intensity module 212, in one embodiment, controls the intensity of a laser signal from a laser print head. For example, if a laser print head is used to print an image on an object, the intensity module 212 may drive the laser using an analog signal that is relative to the resulting intensity of the laser signal emitted by the laser print head. Similarly, the time module 214, in one embodiment, controls the duration of the laser signal from a laser print head. For example, the time module 214 may use pulse-width modulation (PWM) to control the duration of time that the laser emits a signal.

Figure 3:
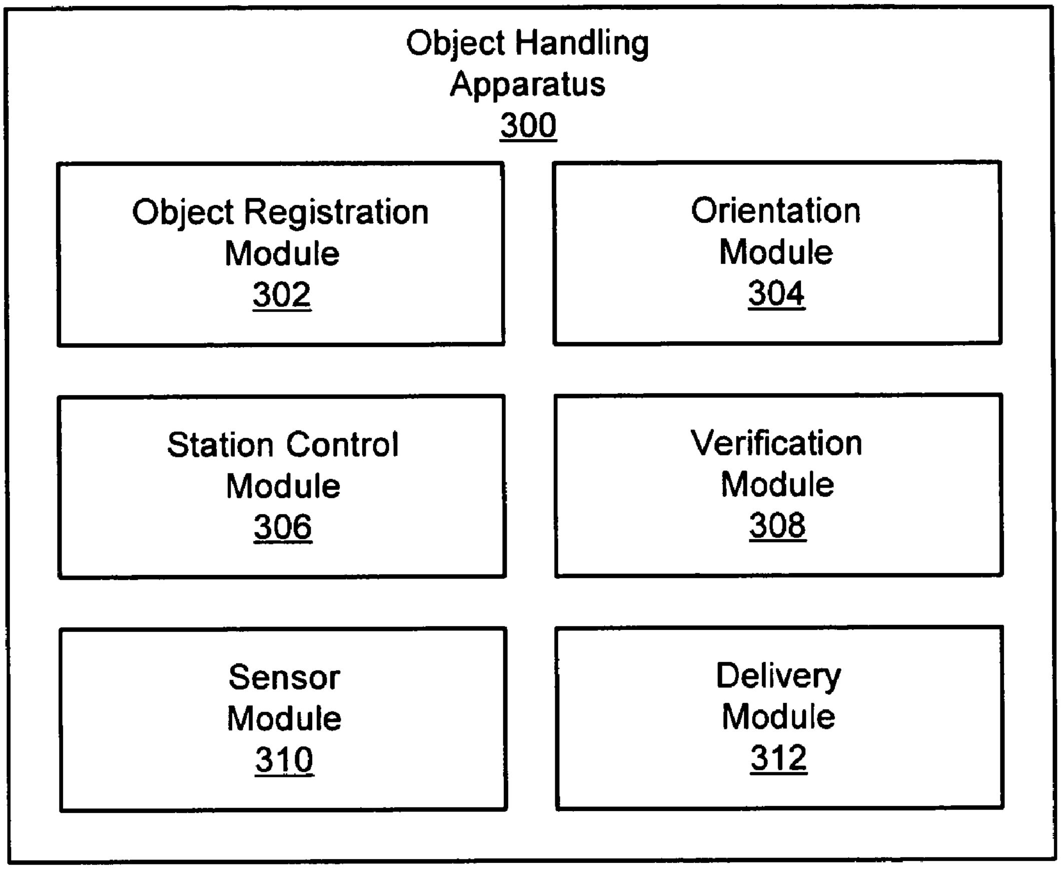
FIG. 3 is a schematic block diagram illustrating one embodiment of an object handling apparatus.

FIG. 3 depicts one embodiment of an object handling apparatus 300 that is given by way of example of the object handling apparatus 112 of FIG. 1. The illustrated object handling apparatus 300 includes an object registration module 302, an orientation module 304, a station control module 306, a verification module 308, a sensor module 310, and a delivery module 312.

In one embodiment, the object registration module 302 is similar to the print head registration module 206, except that it is configured to control the location and orientation of the object rather than the print head. In a further embodiment, the object registration module 302 may be configured to position the object relative to the print head, the print media, a sensor, or another physical device or object. In particular, the object registration module 302 may manipulate the object by moving and rotating the object in a variety of directions (refer to FIG. 5). In one embodiment, the object registration system 302 moves the object so that the registration printing apparatus 200 can be employ the print module 204 to print an image on a multi-dimensional surface of the object. In another embodiment, the object registration module 302 may manipulate the object in conjunction with the print ribbon.

The orientation module 304 is configured, in one embodiment, to orient the object with respect to the physical dimensions of the object. For example, if the object is a ceramic mug having a handle extending from one side of the mug, the orientation module 204 may rotate the mug so that the handle is in a certain, specified, position. The orientation module 204 also may invert the mug (from a typical upright position to an "upside down" position) so that the mug opening opens downward. In one embodiment, the orientation module 304 and the object registration module 302 are used together to orient and position the mug in relation to the print head or print media.

In another example, if the object is a round ball, such as a basketball or baseball, the orientation module 304 may orient the object to locate a seam or printed material in a certain location. Alternatively, the orientation module 304 may orient the object to locate a certain panel for printing. In another example, if the object is a football, the orientation module 304 may orient the object to locate a smooth panel (as opposed to a less smooth panel) for printing.

The station control module 306 of the object handling apparatus 300 is configured, in one embodiment, to move the object to a particular station or location. Examples of stations are provided and discussed in greater detail with reference to FIG. 11. The verification module 308, in one embodiment, is configured to verify the object. Verification of the object may include verifying the orientation of the object in relation to a mechanical arm, hook, or other holding device, verifying the orientation of the object, such as the location of the handle of a mug or seam of a ball, and verifying the source of the object.

Verifying the source of the object refers to sensing a marking that identifies the object as provided by a specific supplier. For example, a supplier may mark the object with a visible or invisible verification marking, such as a dot, a line, a symbol, or any other marking. The verification module 308 facilitates verification that the mark is applied to the object and, in a further embodiment, may verify that the mark is applied to the correct location or in the correct manner. In one embodiment, an ultraviolet marking may be used that is invisible in normal light, but may be sensed by an ultraviolet sensor. In another embodiment, the object may be marked by a radio frequency identifier (RFID). Other markings may be visible or invisible and may be sensed in one or more ways, including digital imaging and recognition, and so forth. In another embodiment, the verification module 308 also may verify the source of a printing cartridge through detection of an identifying mark, such as an RFID.

The sensor module 310 is configured, in one embodiment, to control one or more sensors that may be employed to sense proximity, verification marks, object textures and surface contours, object registration, object orientation, and so forth. Each sensor may comprise one or more sensor technologies currently known in the art. Alternately, a sensor may employ other sensor technologies not known or widely used at the present time.

The delivery module 312, in one embodiment, is configured to deliver the object, after an image has been applied to the object, to a customer. In one embodiment, the delivery module 312 physically moves the printed object to a delivery station (see FIGS. 10 and 11) where the customer may access the object.

Figure 4:
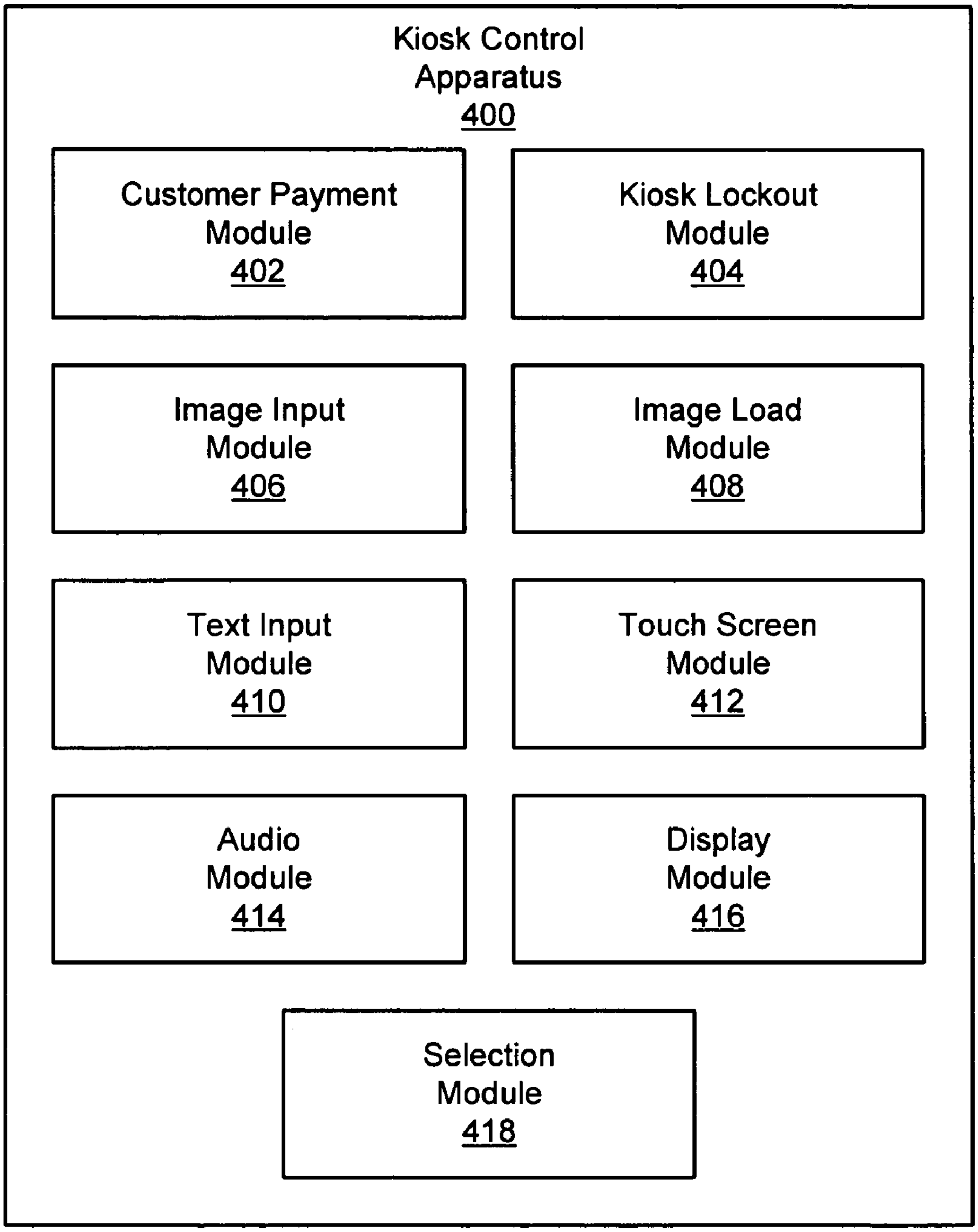
FIG. 4 is a schematic block diagram illustrating one embodiment of a kiosk control apparatus.

FIG. 4 depicts one embodiment of a kiosk control apparatus 400 that is given by way of example of the kiosk control apparatus 114 of FIG. 1. The illustrated kiosk control apparatus 400 includes a customer payment module 402, a kiosk lockout module 404, an image input module 406, an image load module 408, a text input module 410, a touch screen module 412, an audio module 414, a display module 416, and a selection module 418.

In one embodiment, the customer payment module 402 is configured to allow a customer to pay money to purchase an object from the automated kiosk 100. Payment of the money may be in the form of cash, debit card, credit card, or any other method that is known in the art. If payment is made by debit or credit card, the customer payment module 402 may communicate with a remote party via the internet and the internet adapter 106, for example. Alternately, the customer payment module 402 may interface with a telephone service via a telephone adapter (not shown), a network via the network adapter 104, or another manner in order to verify funds for payment with the remote party.

The kiosk lockout module 404, in one embodiment, is configured to allow an owner of the automated kiosk 100 to control access to the automated kiosk 100. In one embodiment, an owner may communicate with the kiosk control apparatus 400 via a local area network (LAN) and the network adapter 104. In another embodiment, a proper monetary payment, using the customer payment module 402, may automatically "unlock" the automated kiosk 100 and allow a user to purchase a product.

The image input module 406 is configured, in one embodiment, to allow a user to input an image that is not currently in the database 116. For example, a user may input an image by inserting a magnetic or optical disk or a flash or similar memory card, by scanning a picture at the automated kiosk 100, by having a digital picture taken at the automated kiosk 100, by downloading a picture from the internet, or by any other method that is known in the art.

In one embodiment, the image load module 408 may be similar to the image input module 406. However, the image load module 408 maybe used to load an image from the database 116. As described above, a loaded image may be combined with a user image to form a concatenated image that may be printed on a multi-dimensional surface via the image concatenation module 208 and the registration printing apparatus 200.

The text input module 410 is similar to the image input module 406 in that it allows a user to input text, numbers, or other symbols or characters. A customer may input text using a local keyboard, a touch screen, or through another method known in the art. In a further embodiment, a customer may wirelessly communicate text from a handheld computing device, such as a personal digital assistant (PDA) or cell phone. In a further embodiment, a customer may download text from the internet.

The input text also may be concatenated with the images as a part of the concatenated image. When concatenating text, customer images, and stock images, the image input module 406, image load module 408, and text input module 410 may be configured to allow the user customer to arrange the images with respect to each image's relative position and overlapping sequence.

The touch screen module 412, in one embodiment, is configured to allow a user to input data and make selections. In other embodiments, the kiosk control apparatus 400 may include a distinct input module, such as a keyboard module, a voice-recognition module, a wireless input module, and so forth. In one embodiment, the voice-recognition module may be further configured to create text from the recognized speech in conjunction with the text input module 410. The touch screen module 412 also may be configured to display and communicate information to the user.

The depicted audio module 414 is configured, in one embodiment, to communicate audible signals to a user. For example, the audio module 414 may communicate a message to the user to confirm a selection made via the touch screen module 412. In a further embodiment, the audio module 414 also may facilitate interpretation of an audible input from the user. For example, the audio module 414 maybe configured to process a user's voice and convert the voice input to text, as explained above.

The display module 416, in one embodiment, is configured to control information that may be displayed to a user, for example, via the touch screen. The touch screen module 412 may communicate with the display module 416 so that a certain user menu, verification output, input image, sample concatenated image, or other data may be displayed to the user. The display module 416 may include, in one embodiment, a display screen, such as an LCD screen, a CRT screen, an alphanumeric display, or any other type of display that is capable of displaying information to a user. In one embodiment, the touch screen may also operate as a display screen. In one embodiment, the selection module 418 is configured to allow a customer to select a multi-dimensional object for purchase.

FIG. 5 depicts one embodiment of a printing system 500 that includes a print head 502 in relation to a multi-dimensional surface of an object 504. In the illustration, the object 504 is shown to be a cylindrical shape. However, the object 504 may be practically any shape that has a multi-dimensional surface to be printed on using one embodiment of the invention described herein. In one embodiment, the multi-dimensional surface may be substantially flat. In another embodiment, the multi-dimensional surface may be rounded. In a further embodiment, the multi-dimensional surface may have a defined edge or many edges. Still further, the multi-dimensional surface may comprise more than one type of texture, contour, shape, or other characteristic.

For example, the multi-dimensional surface may correspond to the outer skin of a basketball, football, baseball, bowling ball, soccer ball, tennis ball, racquetball, golfball, or another type of ball. The multi-dimensional surface alternately may correspond to the outer surface of a ceramic or plastic mug, a glass, a bottle, cellophane packaging, a hockey puck, a plate or dish, ceramic tiles, plastic or metal faceplates, or other comparable surface. In a further embodiment, the multi-dimensional surface may correspond to, for example, the side of a stack of papers, similar to a block of adhesive note pads or the side edge of the pages of a book. Similarly, the multi-dimensional surface may in fact be one of many different surfaces having a unique surface texture, area, contour, shape, color, pattern, and so forth.

In the depicted print system 500, a print media 506 and a receiver layer 508 are interposed between the print head 502 and the object 504. The receiver layer 508, in one embodiment, attaches to the object 504 and allows the ink or dye of the printed image to remain on the object 504. One manufacturer of an example receiver layer 508 is Eastman Kodak Company. Alternatively, the print system 500 may print directly on some objects 504 without using a receiver layer 508.

The print media 506, in one embodiment, is a patch-coded print media, as described above, and the print head 502 is a laser print head. Alternatively, the print head 502 may be another type of print head 502, such as a thermal print head, for example. Although the print head 502 and print media 506 are shown slightly apart from each other and from the receiver layer 508, each of the print head 502 and the print media 506 may be moved, for example, so that the print media 506 is in physical contact with both the receiving layer 508, if used, and the print head 502. In one embodiment, the print head 502 is a laser print head and contacts the print media 506, for example a patch-coded print media, in order to individually print each pixel of an image on the object 504.

As indicated by the directional arrows 510, the print head 502 and/or print media 506 move independently or together in the directions indicated. In a further embodiment, the print head 502, print media 506, or both may move in other directions not shown. In a similar manner, the directional arrows 512, 514 illustrate various ways in which the object 504 may be moved in order to properly register the object 504 relative to the print head 502 and print media 506. Alternatively, the object 504 and print media 506 may be moved together.

In order to move the object 504 in the directions indicated or other directions, the object handling apparatus 300 may include mechanical means to hold, rotate, and otherwise move the object 504. The type of mechanical means that may be employed may depend, at least in part, on the type of object 504 that is being handled. For example, the object handling apparatus 300 may employ rollers or wheels to rotate an object. Alternately, the object handling apparatus 300 may include one or more mechanical arms having multiple joints that allow the arm to hold the object 504 in virtually any position with respect to the, print head 502. In another embodiment, the object handling apparatus 300 may include a vacuum to hold the object 504 using suction.

In another embodiment, the object handling apparatus 300 may include a compression clamp or similar means, such as to hold a football at the points of the football. In another embodiment, the object handling apparatus 300 may include an expansion clamp, such as a hydraulic shaft or an inflatable bladder or balloon. For example, the object handling apparatus 300 may be configured to hold a mug or cup by employing and expansion clamp on the interior of the mug or cup. Beneficially, using an expansion clamp on the interior of the mug, in one embodiment, allows the print head 502 to print on the entire outer surface of the mug, including the handle, if any, and the bottom of the mug, as well as possibly the top rim of the mug, depending on the design of the mug. Examples of mechanical object holding devices are shown and described in more detail with reference to FIGS. 12-14 and 16, although other types of object holding devices may also be implemented.

Figure 6:
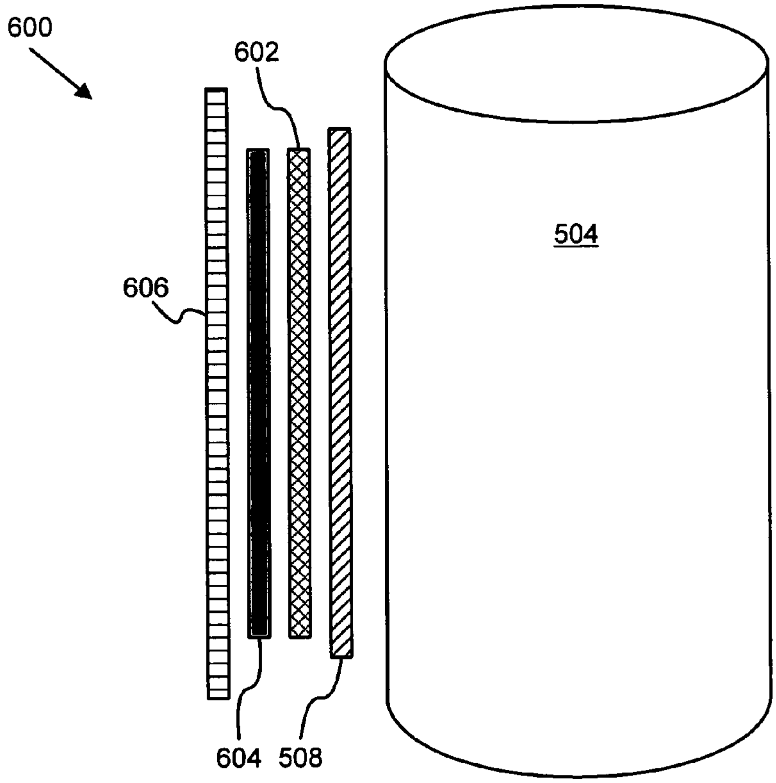
FIG. 6 is a schematic diagram illustrating one embodiment of a layering system.

FIG. 6 depicts one embodiment of a layering system 600. The illustrated layering system 600 is shown in an expanded view for clarity to distinguish among the various layers that may be used to print an image on the object 504. The illustrated layering system 600 includes a receiver layer 508 (as described above with reference to FIG. 5), a color layer 602, a black layer 604, and a protector layer 606. The color layer 602 may comprise ink or dye or another colorant. In one embodiment, the color layer 602 may include several colors including, but not limited to, yellow, magenta, and cyan. Alternately, the layering system 600 may include several distinct color layers 602 each corresponding to one or more colorants or colors.

The black layer 604 may be similar to the color layer 602, except that black colorant, ink, or dye is used instead of a non-black colorant. In a further embodiment, the black layer 604 also may include various shades of black, such as dark and light grays and similar shades of black. In a further embodiment of the layering system 600, one of either the color layer 602 or the black layer 604 may be applied to the object 504 in the absence of the other. Both layers 602, 604 together are not necessary, but may be beneficial in certain applications.

The protector layer 606, in one embodiment, comprises an adhesive coating that may be applied over the color layer 602 and black layer 604 in order to protect such layers 602, 604, as applied to the object 504, for a substantial period of time. One manufacturer of an example protector layer 606 is Eastman Kodak Company. In an alternate embodiment, ultra-violet (UV) inks or dyes may be used in the color layer 602 and black layer 604 so that when the layers 602, 604 are cured, such as by using an ultra-violet lamp, the protector layer 606 is not needed. However, in one embodiment, a durable colorant, such as a curable UV colorant, may be used in conjunction with a protector layer 606.

Figure 7:
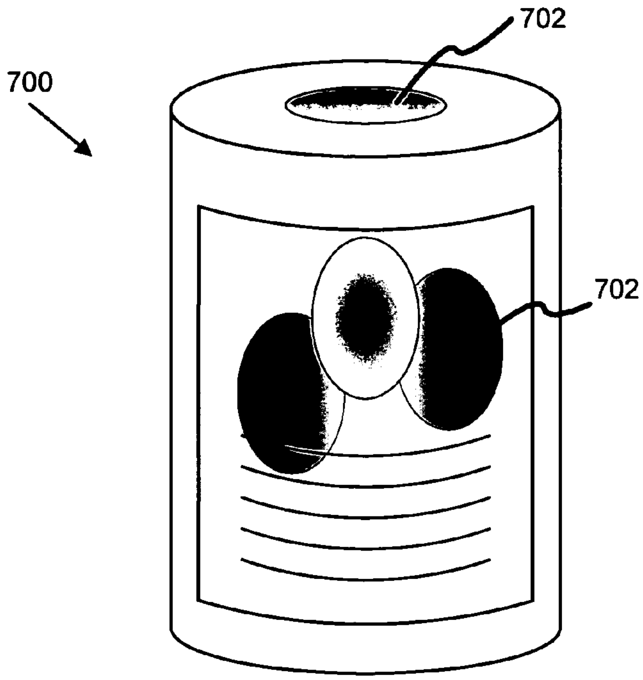
FIG. 7 is a schematic diagram illustrating one embodiment of an object having an image printed on a multi-dimensional surface.

FIG. 7 depicts one embodiment of a printed object 700. The illustrated printed object 700 is representative of a can, cup, mug, or other substantially cylindrical object. The printed object 700 has multiple printed images 702 printed on various surfaces of the object 700. A first printed image 702 on the curved side of the object 700 may include graphics, text, and a border. In one embodiment, these independent image components may have been concatenated via the image concatenation module 208 described with reference to FIG. 2. A second printed image 702 on the top of the object 700 (or bottom of an inverted cup or mug) may include only graphics, for example. Alternately, text may be printed independently of graphics.

Figure 8:
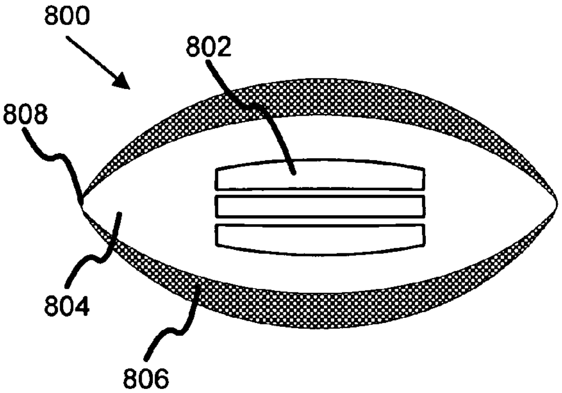
FIG. 8 is a schematic diagram illustrating another embodiment of an object having an image printed on a multi-dimensional surface.

FIG. 8 depicts one embodiment of another printed object 800. In particular, the printed object 800 is representative of a football having a printed image 802 applied to one panel 804 of the football. Sewn footballs are often manufactured having three or four panels 804, 806 that may be of a single color or alternating colors and/or textures. However, printed images 802 may be applied to footballs and other objects 800 that do not have multiple panels. For example, a printed image 802 may be applied to a printed object 800 made of foam, plastic, rubber, and so forth.

The illustrated football has a printed image 802, which may include graphics, symbols, characters, text, etc., applied to a single white panel 804 in a horizontal manner. In another embodiment, the printed image 802 may be applied to multiple panels 804, 806 and even across the seam of two or more panels 804, 806. In another embodiment, the printed image 802 may be wholly or partially printed on the threads (not shown) of the football. In a further embodiment, a printed image 802 may be applied to the point 808 of the football or another printed object 800.

Figure 9:
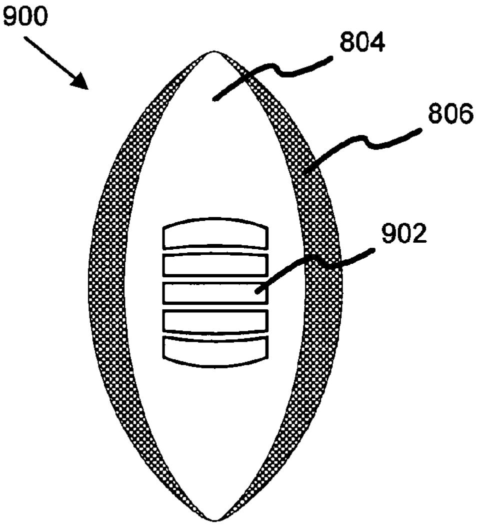
FIG. 9 is a schematic diagram illustrating another embodiment of an object having an image printed on a multi-dimensional surface.

FIG. 9 depicts one embodiment of another printed object 900. Specifically, the illustrated printed object 900 is also representative of a football. The printed object 900 is substantially similar to the printed object 800 of FIG. 8, except that the printed image 902 may be printed on the football in a manner substantially perpendicular to the length of the panels 804, 806. The footballs of FIGS. 8 and 9 exemplify that the object handling apparatus 300 may handle a printed object 800, 900, such as a football, so that the printing may be applied in a variety of ways. However, the distinct printed images 802, 902 also may be applied to the football in substantially the same way, in one embodiment, by digitally manipulating the image (such as by rotating, resizing, etc.) prior to applying the printed image 802, 902 to the printed object 800, 900.

Figure 10:
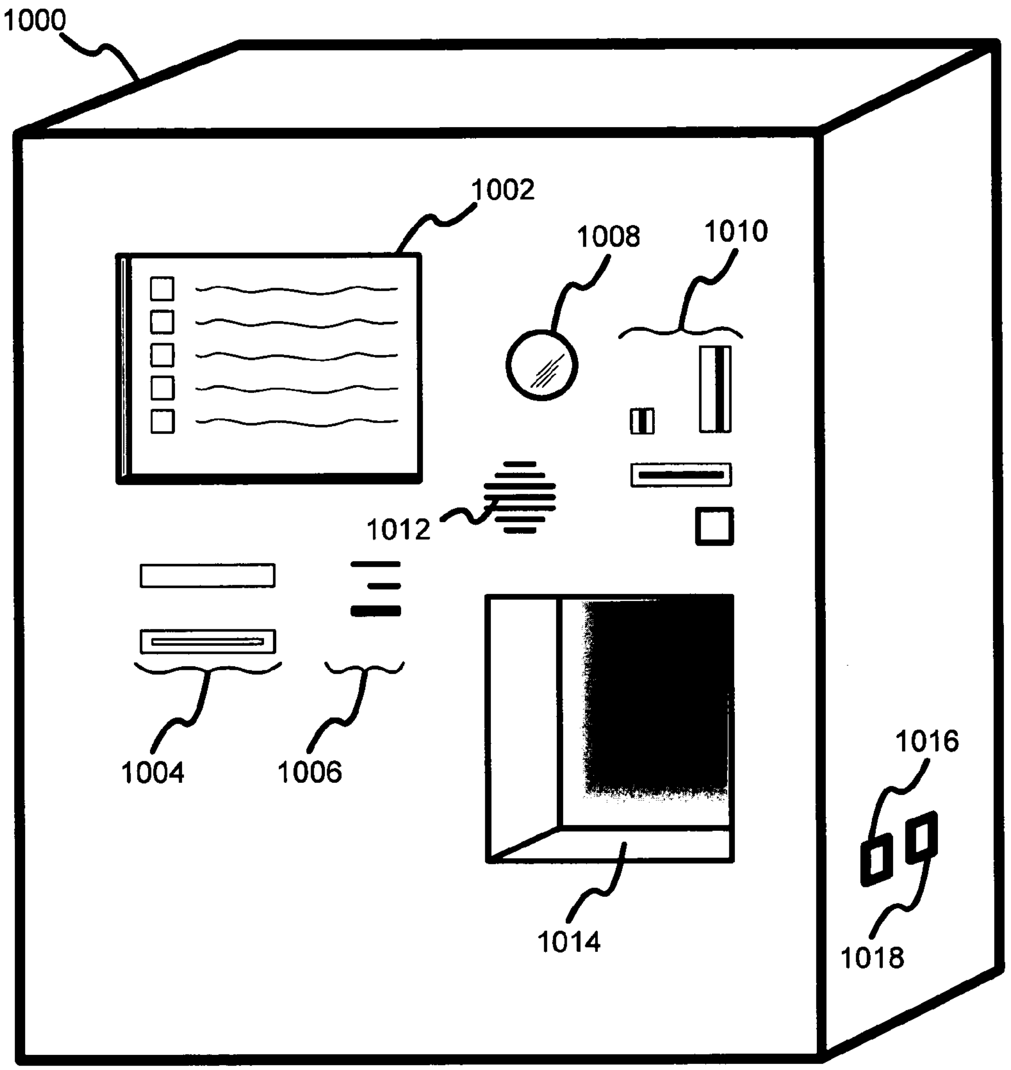
FIG. 10 is a schematic diagram illustrating one embodiment of an automated kiosk given by way of example of the automated kiosk of FIG. 1.

FIG. 10 depicts one embodiment of an automated kiosk 1000 that is given by way of example of the automated kiosk 100 of FIG. 1. In particular, FIG. 10 shows a physical representation of the automated kiosk 1000 as a user may see the automated kiosk 1000. The illustrated automated kiosk 1000 includes a touch screen 1002, various user input devices 1004, 1006, a digital camera 1008, multiple payment devices 1010, an audio interface 1012, a delivery station 1014, a telephone interface 1016, and a network interface 1018. Although omitted here for clarity, the automated kiosk 1000 additionally may include many other necessary and/or desirable features of currently known vending machines or as described herein.

The touch screen 1002 may be configured to display information to a user and to accept input data from the user. Other features of the touch screen 1002 are described with reference to the touch screen module 412 of FIG. 4. The user input devices 1004, 1006 may include floppy disk drives, optical disk drives, jump drives, RAM drives, memory card readers, and so forth. The digital camera 1008 may be used to allow a user to capture a user image and incorporate the captured image into a concatenated image, as described above. The payment devices 1010 may include known devices, such as coin and bill inputs, a credit card reader, and a change return. In a further embodiment, the payment devices 1010 also may include features to allow payment via PDA, cell phone, and so forth.

The audio interface 1012 may include a microphone to receive user input and a speaker to communicate audible output to the user. The delivery station 1014 is configured to allow the object handling apparatus 300 to deliver a printed object 700, 800, 900 to the user. In one embodiment, the object handling apparatus 300 may release the printed object 700, 800, 900 into a cushioned basket or onto a platform, for example, where the user may access and collect the printed object 700, 800, 900. The telephone interface 1016 and network interface 1018 are configured, in one embodiment, to allow the kiosk 1000 and a user to communicate with one another as needed.

Figure 11:
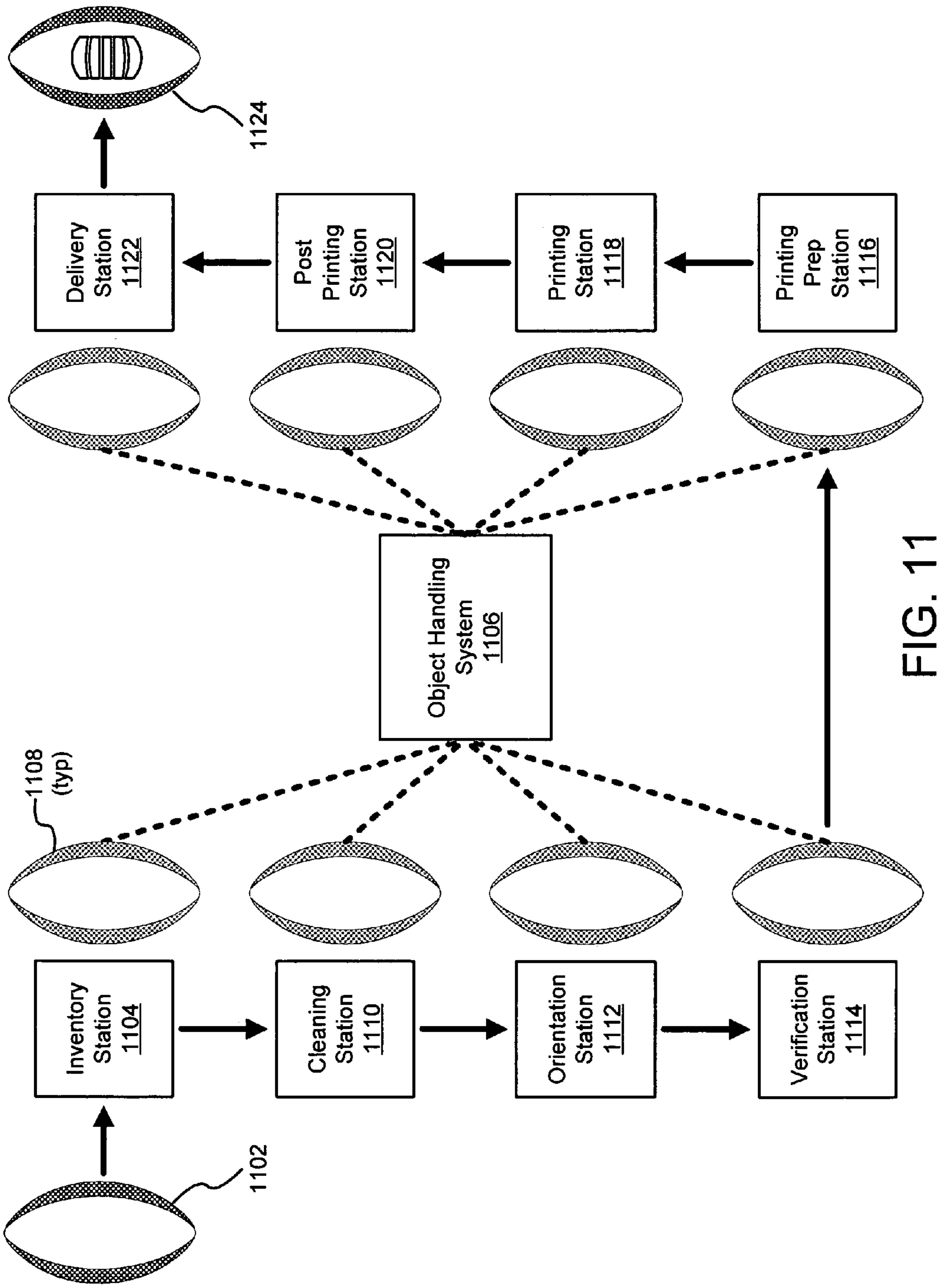
FIG. 11 is a schematic flow chart diagram illustrating one embodiment of a multi-dimensional registration printing method.

FIG. 11 depicts one embodiment of a multi-dimensional registration printing method 1100 that may be employed using the automated kiosk 1000 of FIG. 10. The illustrated printing method 1100 begins by locating an unprinted object 1102 at an inventory station 1104 that is accessible by the object handling system 1106, which includes the object handling apparatus 300. The inventory station 1104, in one embodiment, may comprise a crate or bin containing one or many unprinted objects 1102. Additionally, the unprinted objects 1102 may be oriented within the inventory station in a particular manner. In an alternate embodiment, a single unprinted object 1102 may be manually inserted into the inventory station 1104 by a user.

The object handling system 1106 is configured to handle the unprinted object 1102. The unprinted object 1102 may be referred to as a handled object 1108 as it is handled by the object handling system 1106 at and among the many stations. Handling of the handled object 1108 is depicted by a dashed line between the handled object 1108 and the object handling system 1106. As shown, the object handling system 1106 is configured to handle the handled object 1108 at each station within the automated kiosk 1000, for example.

Upon request from a user, the object handling system 1106 may remove a handled object 1108 from the inventory station 1104 and move the object 1108 to the cleaning station 1110.

At the cleaning station 1110, the handled object 1108 may be cleaned, in one embodiment, by blowing air across the object 1108. In other embodiments, the handled object 1108 may be cleaned by wiping, spraying, or other means.

The object handling system 1106 then may move the handled object 1108 to an orientation station 1112 where the object 1108 may be oriented prior to the registration printing. In one embodiment, the object handling apparatus 300 may employ the orientation module 304 to orient the object 1108. The object handling system 1106 may subsequently handle the object 1108 so that the verification module 308 may verify the handled object 1108. Further details of this orientation and verification are provided with reference to FIG. 3.

The object handling system 1106 then moves the handled object 1108 to a printing prep station 1116 where, in one embodiment, a receiver layer 508 may be applied to the object 1108. In other embodiments, the handled object 1108 may be further prepared prior to the registration printing. The object handling system 1106 then moves the object 1108 to a printing station 1118. At the printing station 1118, the print head 502 applies the images or concatenated images to the surface of the handled object 1108. Specifically, the object handling system 1106 may move the handled object 1108 in a precise manner, which may include intricate patterns and other detailed movements, so that each pixel of the printed image is properly located on the multi-dimensional surface of the handled object 1108.

The handled object 1108 is then moved to a post printing station 1120, in one embodiment, where post printing activities may occur, including drying, curing, applying a protector layer 606, and so forth. Finally, the object handling system 1106 moves the handled object 1108 to a delivery station 1122, which may be substantially similar to the delivery station 1014 of FIG. 10. The user then may collect the printed object 1124 from the delivery station 1122. The depicted multi-dimensional registration printing method 1100 then ends.

Figure 12:
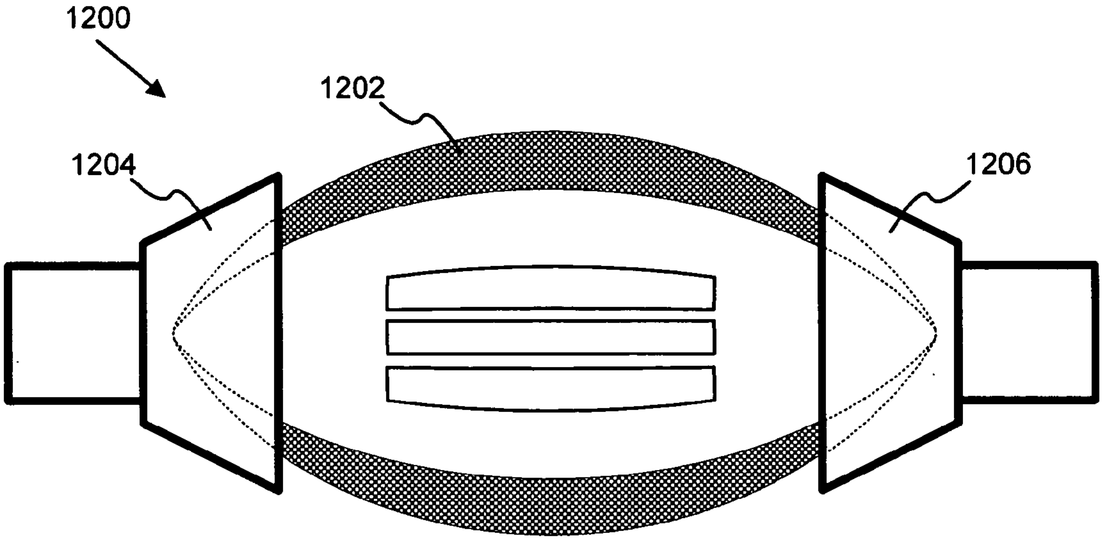
FIG. 12 is a schematic diagram illustrating one embodiment of an object holding device.

FIG. 12 depicts one embodiment of an object holding device 1200. The illustrated object holding device 1200 holds a football 1202 through placement of a first holding receiver 1204 and a second holding receiver 1206 on either end of the football 1202. Each holding receiver 1204, 1206 may include a receiving cavity into which the ends of the football 1202 may be located. In one embodiment, the cavities may be formed of a hard substance, such as machined metal or hard plastic. In a further embodiment, the cavities may be lined with a softer material, such as a rubber or gel, that acts to grip the football 1202 so that the football does not rotate within the holding receivers 1204, 1206. In one embodiment, the holding receivers 1204, 1206 may be substantially similar to one another. However, the holding receivers 1204, 1206 alternatively may be dissimilar in one or more ways.

Figure 13:
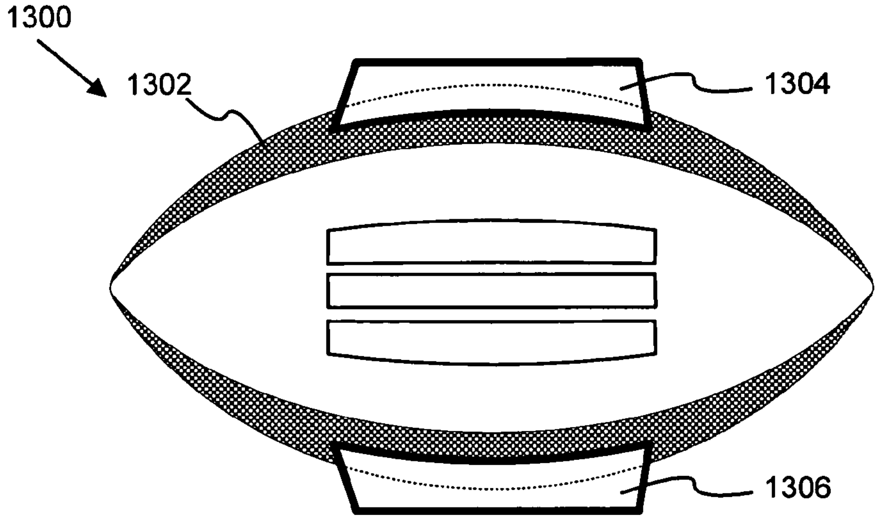
FIG. 13 is a schematic diagram illustrating another embodiment of an object holding device.

FIG. 13 depicts one embodiment of another object holding device 1300. The illustrated object holding device 1300 also holds a football 1302 or similar object. However, the illustrated object holding device 1300 employs a pair of holding clamps 1304, 1306 instead of the holding receivers 1204, 1206 depicted in FIG. 12. The holding clamps 1304, 1306 may be substantially flat, in one embodiment, or may be contoured to match the curvature of the football 1302 or other object.

Figure 14:
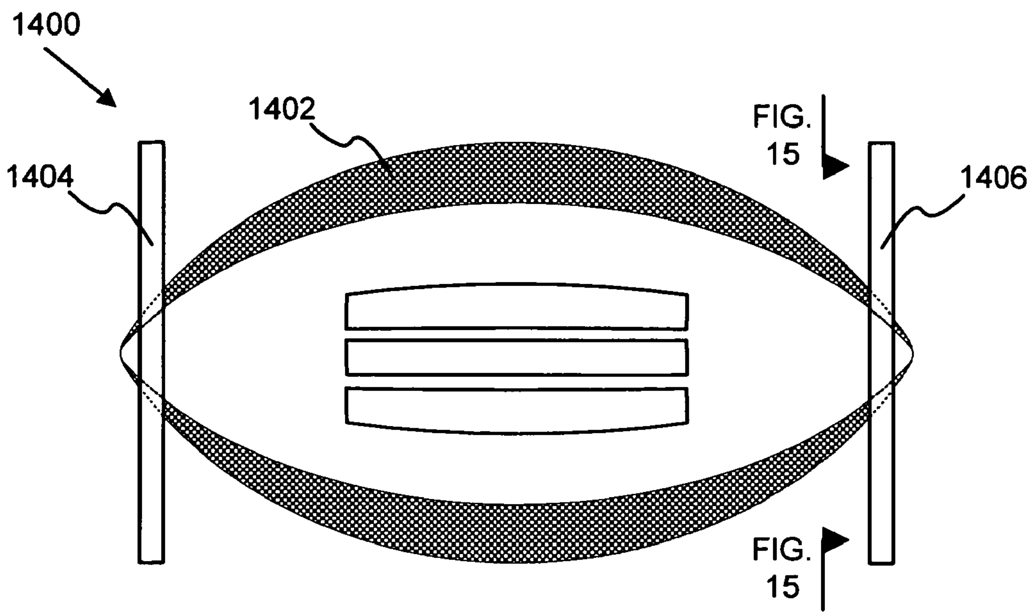
FIG. 14 is a schematic diagram illustrating another embodiment of an object holding device.

FIG. 14 depicts one embodiment of another object holding device 1400. The illustrated object holding device 1400 also holds a football 1402 or similar object. The object holding device 1400 employs a first holding plate 1404 and a second holding plate 1406 on either end of the football 1402. A front view of the holding plate 1406 is shown and described in more detail with reference to FIG. 15. In one embodiment, the holding plates 1404, 1406 may be substantially similar to one another. Alternatively, the holding plates 1404, 1406 may be dissimilar in one or more ways.

Figure 15:
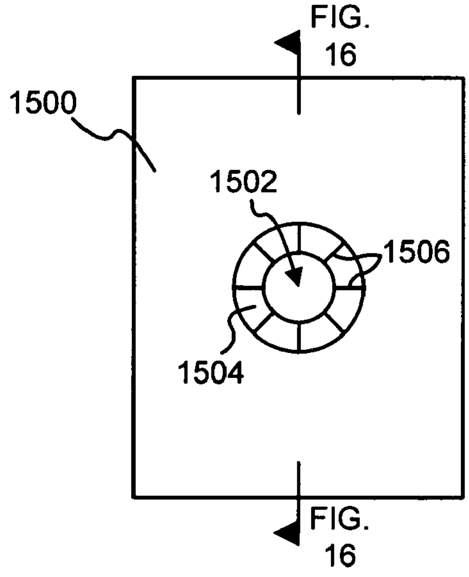
FIG. 15 is a schematic diagram illustrating a front view one embodiment of an object holding device substantially similar to the object holding device of FIG. 14.
Figure 16:
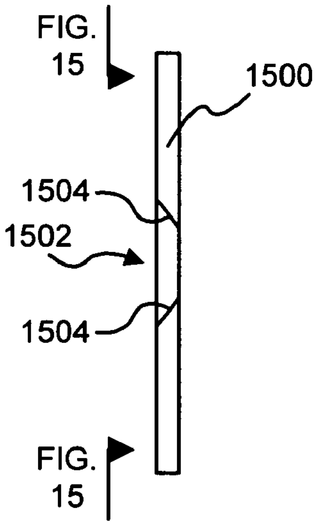
FIG. 16 is a schematic diagram illustrating a sectional view of the embodiment of the object holding device shown in FIG. 15.

FIG. 15 depicts a front view of one embodiment of a holding plate 1500 that is substantially similar to the holding plate 1406 of FIG. 14. Similarly, FIG. 16 depicts a corresponding sectional view of the holding plate 1500. The illustrated holding plate 1500 includes a receiving aperture 1502 that is defined by a diameter that varies in relation to the width of the receiving plate 1500. In other words, the side wall 1504 of the aperture may be contoured to match or approximate the contour of the object to be held by the holding plate 1500. In the illustrated embodiment, the side wall 1504 of the holding plate 1500 is contoured to match the contour of the football 1402. Alternatively, the aperture 1402 may have a constant diameter or a diameter that is dissimilar from the contour of the object.

In another embodiment, the holding plate 1500 also may include one or more ridges 1506 (not shown in FIG. 16) located along the side wall 1504. The ridges 1506 may aid in maintaining the object in a single position, thereby preventing the object from rotating within the aperture 1502 of the receiving plate 1500.

Figure 17:
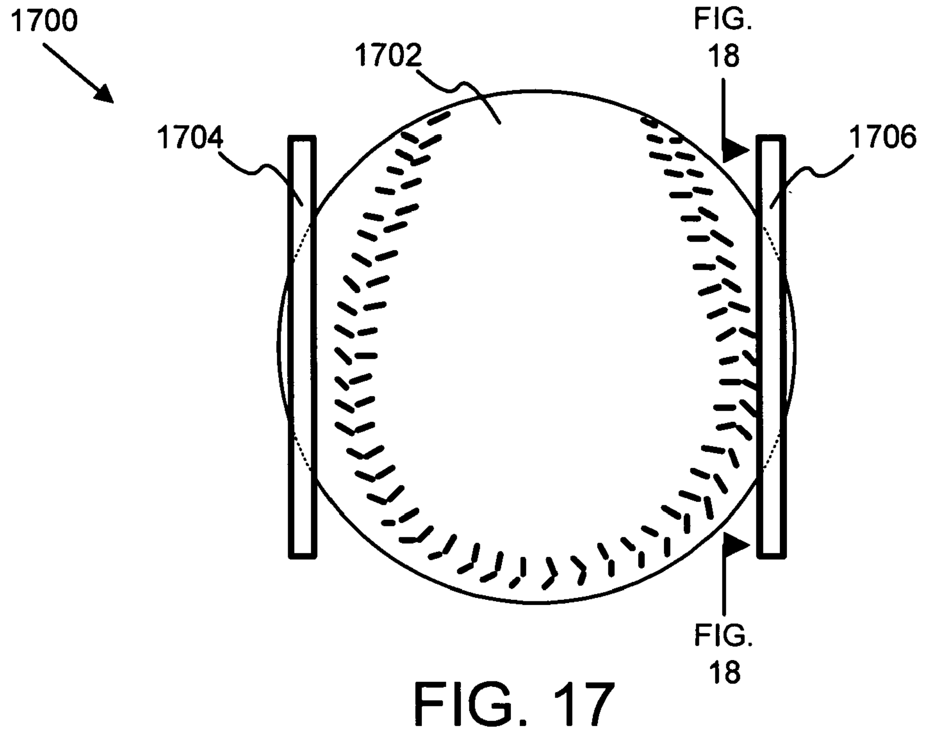
FIG. 17 is a schematic diagram illustrating another embodiment of an object holding device.

FIG. 17 depicts one embodiment of another object holding device 1700. The illustrated object holding device 1700 holds a baseball 1702 or similar object having a substantially spherical shape. The object holding device 1700 employs a first holding plate 1704 and a second holding plate 1706 on either end of the baseball 1702. A front view of the holding plate 1706 is shown and described in more detail with reference to FIG. 18. In one embodiment, the holding plates 1704, 1706 may be substantially similar to one another. Alternatively, the holding plates 1704, 1706 may be dissimilar in one or more ways.

Figure 18:
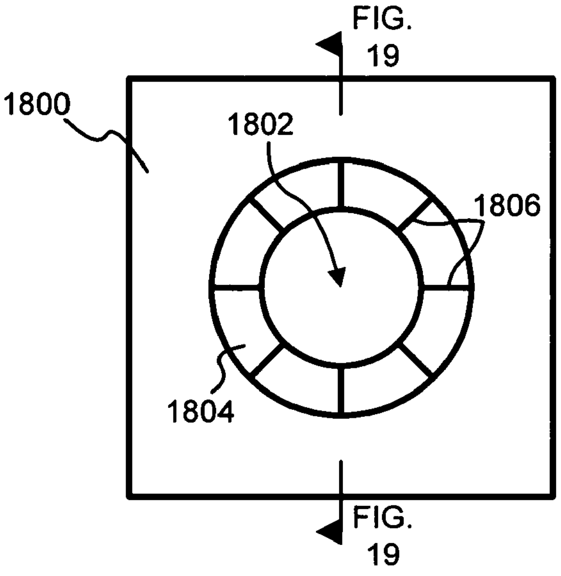
FIG. 18 is a schematic diagram illustrating a front view of one embodiment of an object holding device substantially similar to the object holding device of FIG. 17.
Figure 19:
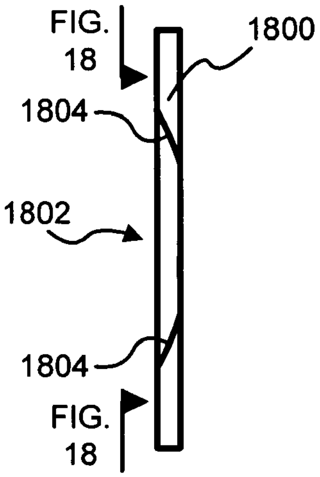
FIG. 19 is a schematic diagram illustrating a sectional view of the embodiment of the object holding device shown in FIG. 18.

FIG. 18 depicts a front view of one embodiment of a holding plate 1800 that is substantially similar to the holding plate 1706 of FIG. 17. Similarly, FIG. 19 depicts a corresponding sectional view of the holding plate 1800. The illustrated holding plate 1800 includes a receiving aperture 1802 that is defined by a diameter that varies in relation to the width of the receiving plate 1800. In other words, the side wall 1804 of the aperture may be contoured to match or approximate the contour of the object to be held by the holding plate 1800. In the illustrated embodiment, the side wall 1804 of the holding plate 1800 is contoured to match the contour of the baseball 1702. Alternatively, the aperture 1802 may have a constant diameter or a diameter that is dissimilar from the contour of the object.

In another embodiment, the holding plate 1800 also may include one or more ridges 1806 (not shown in FIG. 19) located along the side wall 1804. The ridges 1806 may aid in maintaining the object in a single position, thereby preventing the object from rotating within the aperture 1802 of the receiving plate 1800.

Figure 20:
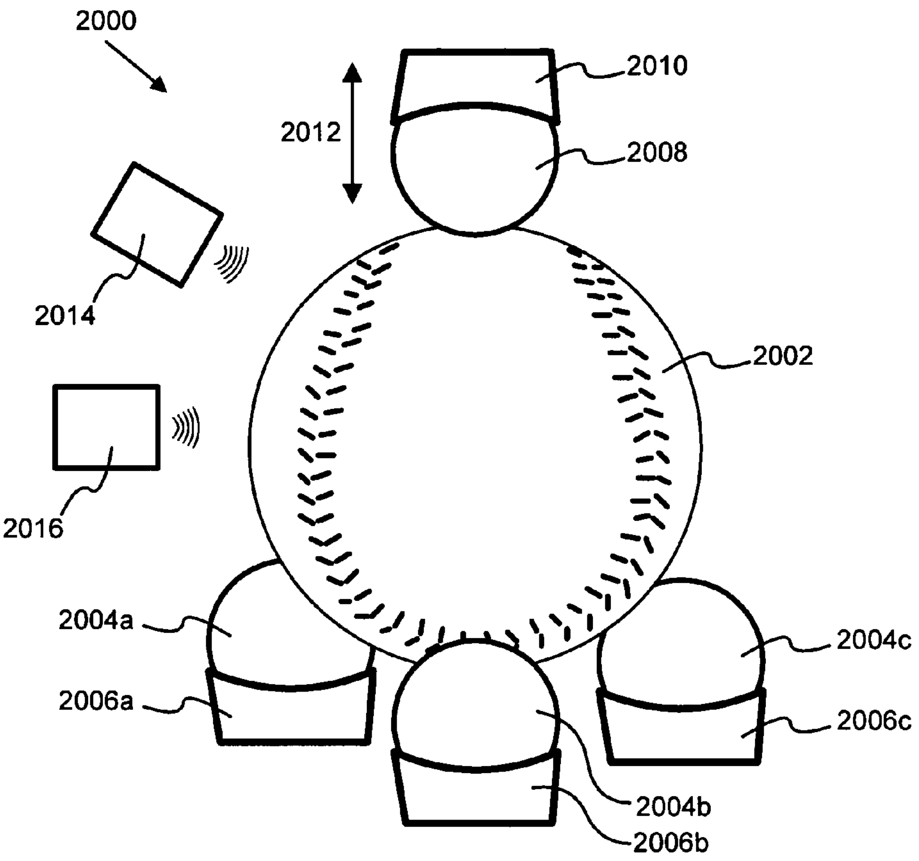
FIG. 20 is a schematic diagram illustrating one embodiment of an object orientation device.

FIG. 20 depicts one embodiment of an object orientation device 2000. The illustrated object orientation device 2000 is configured to orient a baseball 2002 or other substantially spherical object. Other types of orientation devices maybe employed to orient objects of other shapes and/or sizes. For example, a football may be oriented by rotating it around its longitudinal axis. A tile may be oriented by determining its rectangular size. A mug may be oriented by rotating it until its handle hits a mechanical switch. Furthermore, orientation devices for objects of various types of shapes and sizes may be implemented to orient the object to locate a printing surface of the object.

The illustrated object orientation device 2000 includes three object rollers 2004. Each object roller 2004 is mounted in a roller mount 2006. In one embodiment, the object rollers 2004 may be configured to rotate freely in any direction, thereby allowing the baseball 2002 to rotate in any direction around one or more axes. In a further embodiment, one or more of the object rollers 2004 may be driven to, in turn, rotate the baseball 2002.

In one embodiment, the three object rollers 2004 maybe space approximately 120 degrees apart from one another with respect to the vertical axis of the baseball 2002. In alternative embodiment, the object orientation device 2000 may include fewer or more object rollers 2004, which may be spaced evenly or unevenly around the baseball 2002.

The illustrated object orientation device 2000 also includes a fourth object roller 2008 that is mounted in a corresponding roller mount 2010. The fourth object roller 2008 is located above the baseball 2002 approximately in line with the vertical axis of the baseball 2002. The fourth object roller 2008 may facilitate maintaining the baseball in contact with the other object rollers 2004 as the baseball 2002 is rotated in one or more directions. In another embodiment, the fourth object roller 2008 may be driven to cause the baseball 2002 to rotate. Alternatively, other rollers may be included to drive the baseball 2002 in one or more directions.

The illustrated object orientation device 200 also includes one or more sensors 2014, 2016, which may facilitate recognizing the baseball 2002 and/or orienting the baseball 2002 in a particular position. For example, one sensor 2014 may sense the contour of the baseball 2002 to determine its shape. In another embodiment, the sensor 2014 may sense seams or other surface features of the baseball 2002. The other sensor 2016 may be configured, in one embodiment, to recognize text or other graphical images already printed on the surface of the baseball 2002. In another embodiment, the sensor 2016 may determine which surfaces of the baseball 2002 are smooth and which surfaces are not smooth. In this way, through one or more sensors 2014, 2016, the object orientation device 2000 may determine which surface area of the baseball 2002 is suitable for printing and which surface area may be unsuitable for printing.

Figure 21:
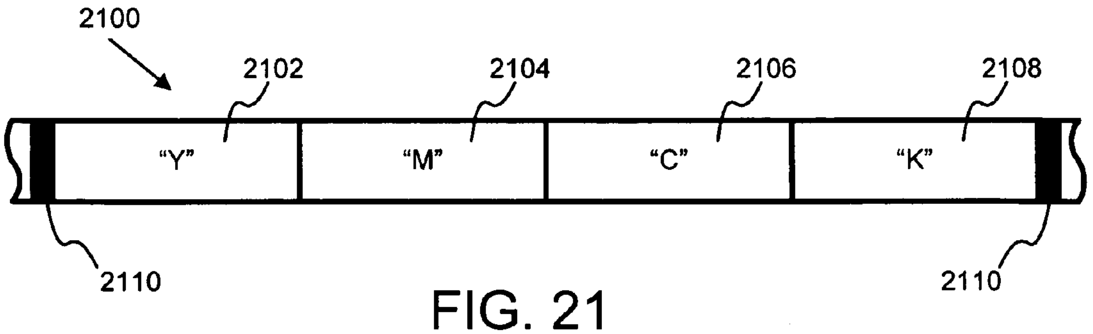
FIG. 21 is a schematic diagram illustrating one embodiment of a panelized print ribbon.

FIG. 21 depicts one embodiment of a panelized print ribbon 2100. The illustrated print ribbon 2100 includes four separate, alternating panels. Each panel has a dye thereon that may be transferred from the print ribbon to an object. Namely, the print ribbon 2100 includes a yellow "Y" panel 2102, a magenta "M" panel 2104, a cyan "C" panel 2106, and a black "K" panel 2108. In other embodiments, the print ribbon 2100 may include fewer or more panels. Additionally, the print ribbon 2100 may include fewer or more colors or alternative colors to the colors listed above. In one embodiment, the print ribbon 2100 may include solvent-based or water-based inks. In another embodiment, the print ribbon 2100 may be monochromatic. In another embodiment, the dye may be thermal-chromatic.

The illustrated print ribbon 2100 also includes registration marks 2110 that delineate the end of one panel sequence from the beginning of another panel sequence (e.g. YMCK|YMCK). In one embodiment, a printing device may sense the registration marks 2110 to determine the advancement of the print ribbon in relation to a print head.

Other substances also may be applied to the dye carrier medium (the ribbon) in addition to the dye colorant. These substances may be applied individually to the dye carrier medium, in one embodiment, or may be mixed with the dye before the dye mixture is applied to the dye carrier medium.

One possible agent that may be applied to the dye carrier medium is a resin that allows the dye to be applied to a variety of object surfaces. The resin may reduce or eliminate the need for a receiving layer. One manufacturer of resin-based print cartridges is International Imaging Materials, Inc. of Amherst, N.Y.

Another agent that may be applied to the dye carrier medium is an infrared (IR) absorbent. The IR absorbent absorbs IR energy in the form of heat, thereby transferring the dye through sublimation from the print ribbon to an object. One example of the absorbance of an IR absorbent is represented and described in more detail with reference to FIG. 26. One manufacturer of IR absorbent is Epolin, Inc. of Newark, N.J.

An IR absorbent may be added to the dye in various amounts. In one embodiment, the IR absorbent may be added in a liquid form. In another embodiment, the IR absorber may be a percentage of the overall dye mixture. Alternatively, the amount of IR absorbent may be a percentage relative to the dye colorant in either liquid or solid form. For example, the amount of IR absorbent may be between approximately two and twenty percent by total weight of a solid dye colorant. More particularly, the IR absorbent may be between approximately four and ten percent by total weight of a solid dye colorant. In one embodiment, the IR absorbent may be approximately six percent of the total weight of a solid dye colorant. In another embodiment, the IR absorbent may be less than approximately two percent by total weight of a wet dye mixture.

The spectrum of IR wavelengths is approximately between 750 nanometers (nm) and 1 millimeter (mm). (Visible light has a frequency slightly above the IR spectrum with wavelengths between about 400 nm and 750 nm). Use of the IR absorbent allows a single IR laser to be used in order to sublimate the dye and transfer any or all of the colors (e.g. YMCK) to an object. In one embodiment, relatively little IR absorbent may be mixed with a dye in order to allow the IR absorbent to react to the IR laser.

Although IR absorbents are discussed in detail herein, other types of absorbents also may be used. For example, other absorbents that are reactive to non-IR wavelengths, such as visible wavelengths between approximately 400 nm and 750 nm or other non-IR wavelengths, may be used.

Figure 22:
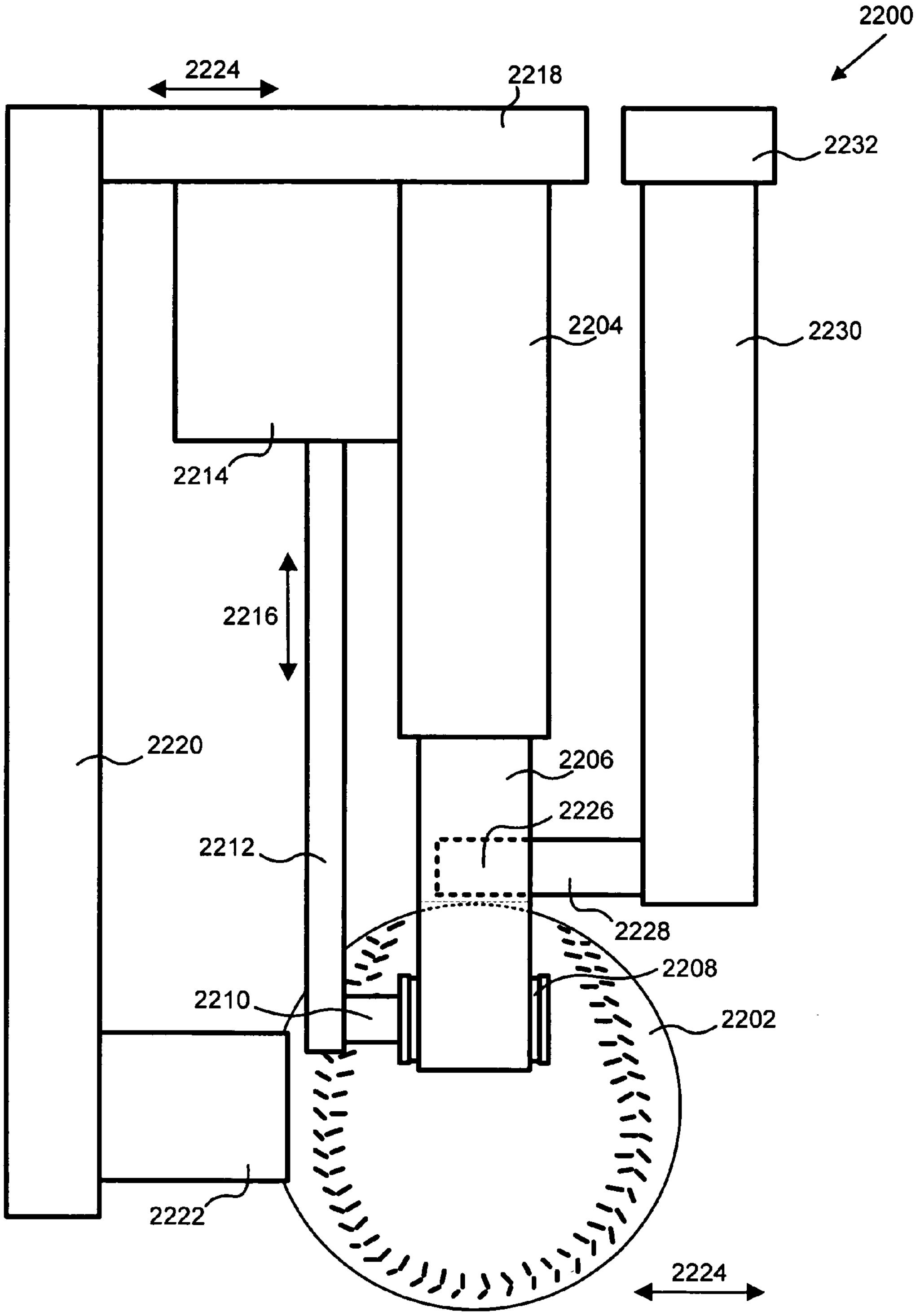
FIG. 22 is a schematic diagram illustrating a side view of one embodiment of a printing system.

FIG. 22 depicts a side view of one embodiment of a printing system 2200. The illustrated printing system 2200 is configured to print an image on a surface of an object, such as a baseball 2202. Alternatively, the printing system 2200 may print an image on a substantially flat object rather than a multi-dimensional object having a contoured surface.

The depicted printing system 2200 includes a print cartridge 2204 that has a print ribbon 2206. The print ribbon 2206 may be extended away from the print cartridge 2204 by a ribbon roller 2208 that is connected to a roller mount 2210 that, in turn, is coupled to an extension arm 2212. In one embodiment, an arm controller 2214 may control the movement of the extension arm 2212, as indicated by the arrow 2216. Although the extension arm 2212 is depicted in FIG. 22 as a linear extension arm, the extension arm 2212 may be another type of extension arm, such as a radial extension arm or another type of extension arm that extends the print ribbon 2206 away from the print cartridge 2204.

In the illustrated embodiment, printing cartridge 2004 and the arm controller 2214 are both coupled to a registration mount 2218. The registration mount 2218 is coupled to a registration device 2220. Similarly, the object handling device 2222 is also coupled to the registration device 2220. The registration device 2220, in one embodiment, moves the registration mount 2218 and the object handling device 2222 to orient the print cartridge 2204 and the object 2202. The registration device 2220 may move the registration mount 2218 and the object handling device 2222 together or individually in the directions indicated by the arrow 2224. Alternatively, the registration device 2220 may move the registration mount 2218 and the object handling device 2222 together or individually in other directions with respect to a print head 2226.

In one embodiment, the print head 2226 is a laser print head that emits an IR signal. Alternatively, the print head 2226 may be one or more laser print heads that emit laser signals of other frequencies. In another embodiment, the print head 2226 may be another type of print head, such as a thermal print head or another type of print head.

The print head 2226 is coupled, in one embodiment, to a print head mount 2228 that, in turn, is coupled to a print head arm 2230. In the illustrated embodiment, the print head arm 2230 may be coupled to a print head base 2232. Alternatively, the print head arm 2230 may be coupled to a print head registration device that, similar to the registration device 2220, moves the print head with respect to the print ribbon 2206 and/or the object 2202.

Other standard and/or known components of a typical printing system, although not shown, may be provided to implement the printing system 2200 illustrated in FIG. 22. Furthermore, another type of printing system, such as an inkjet printing system, may be provided to implement the printing system 2200.

Figure 23:
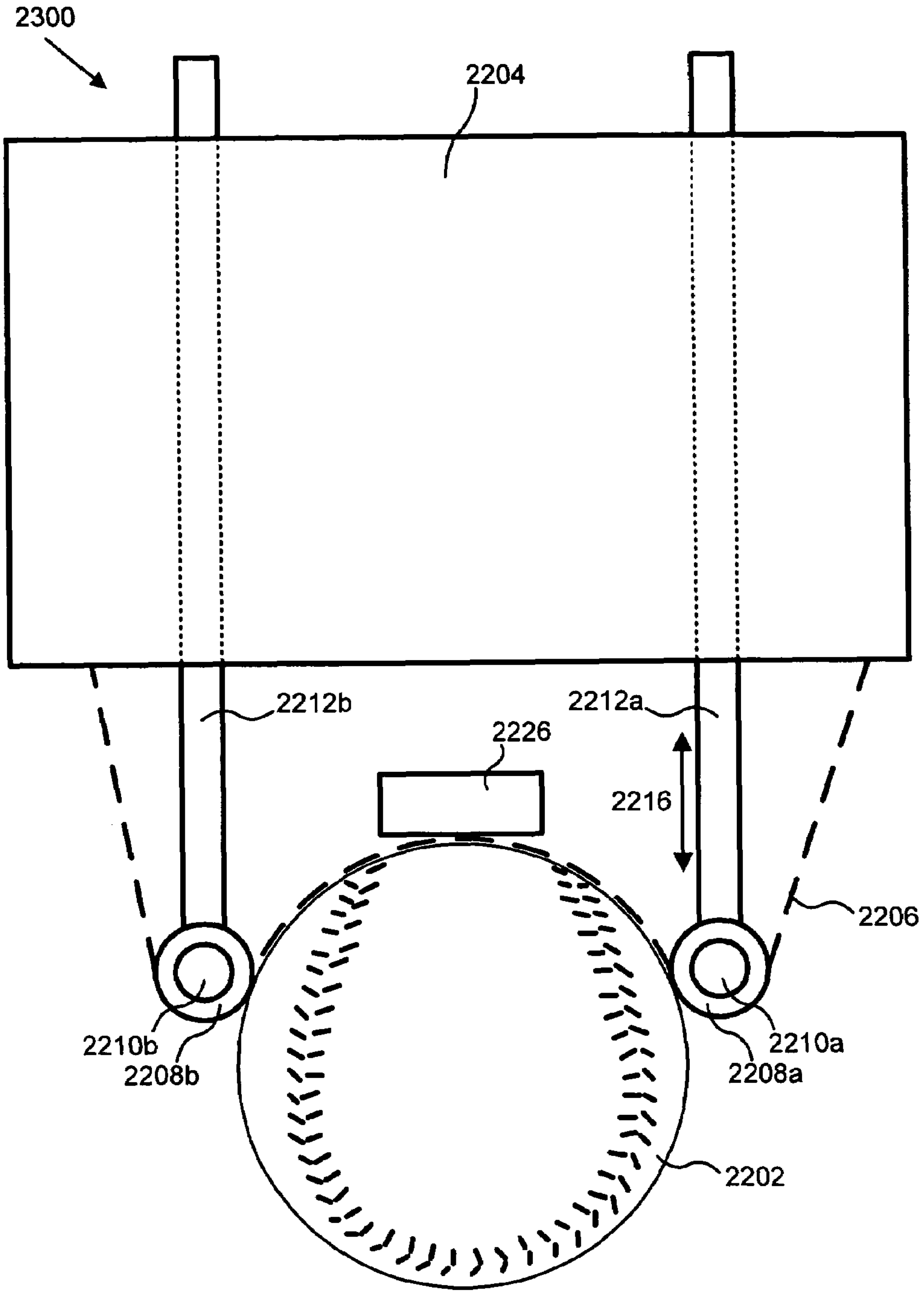
FIG. 23 is a schematic diagram illustrating a front view of one embodiment of the printing system of FIG. 22.

FIG. 23 depicts a front view of a one embodiment of a printing system 2300 that is substantially similar to the printing system 2200 of FIG. 22, in which like reference numbers refer to like system elements. In particular, the illustrated printing system 2300 includes the object 2202, the print cartridge 2204, and the print ribbon 2206 (shown dashed). The printing system 2300 also includes multiple ribbon rollers 2208, each mounted to a roller mount 2210 that is coupled to an extension arm 2212. As described above, the extension arms 2212 may be moved linearly, in the direction indicated by the arrow 2216.

As the extension arms 2212 extend the ribbon rollers 2208 away from the print cartridge 2204, the ribbon rollers 2204 pull the print ribbon 2206 out of the print cartridge 2204. Additionally, the print ribbon 2206 may be pulled across a contoured surface of the object 2202 in order to put the print ribbon 2206 substantially in contact with the object 2202 at approximately the location of the print head 2226. Once the print ribbon 2206 is pulled a sufficient distance from the print cartridge 2204, the print head 2226 may be inserted between the print cartridge 2204 and the print ribbon 2206, approximately adjacent to the print ribbon 2206. Alternatively, the registration device 2220 (shown in FIG. 22) may move the print cartridge 2204 and the object 2202 (by way of the object handling device 2222 shown in FIG. 22) while the print head remains substantially stationary.

In order to print an image on the object 2202, the print head may print a pixel on the object 2202 through application of a laser signal (for a laser print head) on the print ribbon 2206. Printing may continue through movement of one or more system elements, including advancement of the print ribbon 2206 with respect to the object 2202, registration of the print ribbon 2206 with respect to the object 2202 and/or the print head 2226, registration of the object 2202 with respect to the print ribbon 2206 and/or the print head 2226, registration of the print head 2226 with respect to the object 2202 and/or the print ribbon 2206, or registration of another system element. In certain embodiments, registration also may be referred to as indexing.

Figure 24:
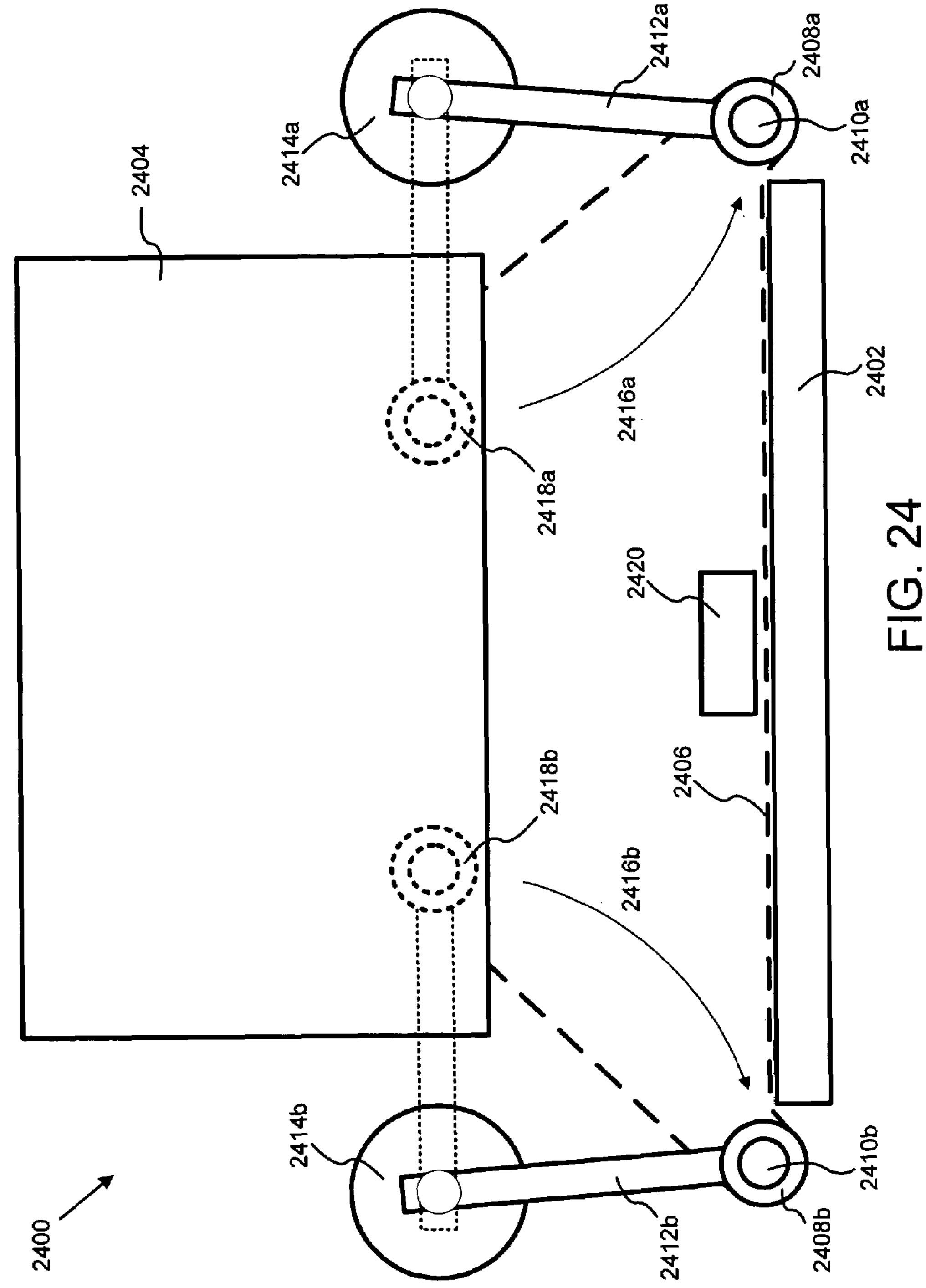
FIG. 24 is a schematic diagram illustrating a front view of another embodiment of a printing system.

FIG. 24 depicts a front view of one embodiment of another printing system 2400. The illustrated printing system 2400 is substantially similar to the printing system 2300 of FIG. 23, in many respects. For example, the printing system 2400 includes an object 2402, a print cartridge 2204, and a print ribbon 2206. The printing system 2400 also includes ribbon rollers 2208 mounted to roller mounts 2410 that are coupled to extension arms 2412. The extension arms 2412, however, are radial extension arms rather than linear extension arms, as shown in FIGS. 22 and 23. The radial extension arms 2412 are coupled to radial arm controllers 2414 that move the ribbon rollers 2408 in a radial, or arcuate, path to extend the print ribbon 2206 away from the print cartridge 2204.

Implementation of radial extension arms 2412 may allow the print ribbon 2206 to span a wider object 2402 than would otherwise be possible. For example, radial extension arms 2412 may allow the print ribbon 2206 to span a ceramic tile that is wider than a baseball or even wider than the print cartridge 2404. However, linear extension arms 2214 may be configured to achieve similar performance depending on the configuration of the linear extension arms 2214. For example, the arms may be oriented in a non-parallel configuration that allows the ribbon rollers 2208 to move away from one another as the ribbon rollers 2408 are extended away from the print cartridge 2204. Other embodiments may implement other configurations of linear extension arms 2214 and/or radial extension arms 2414 to accommodate an object of a particular size or shape.

Figure 25:
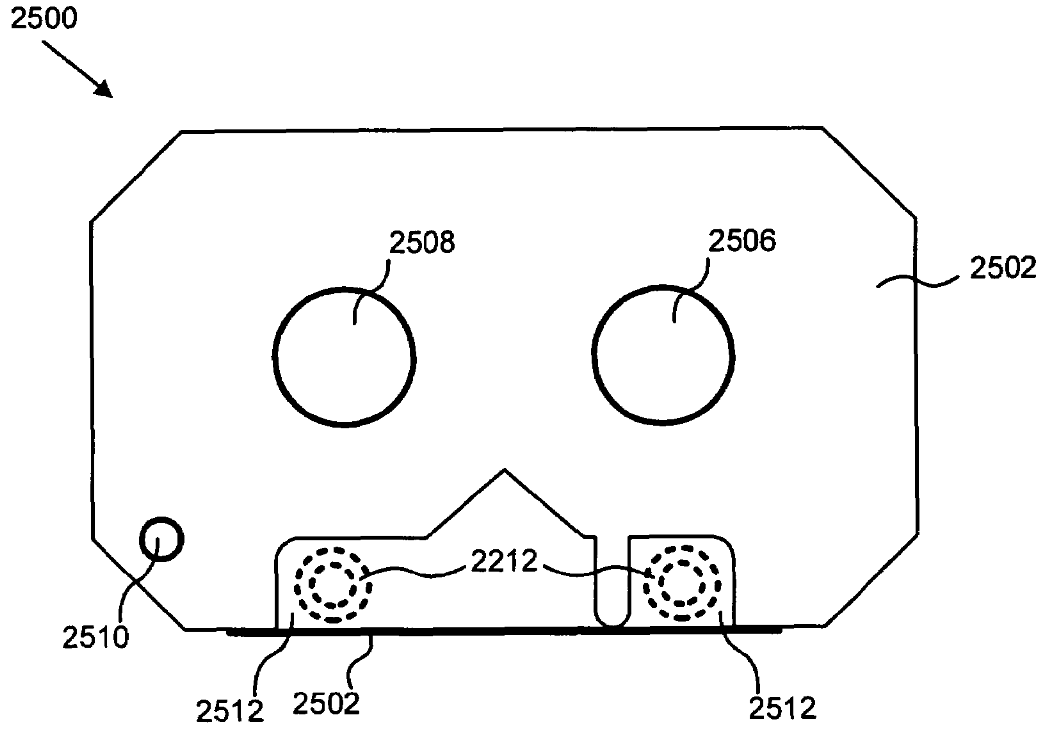
FIG. 25 is a schematic diagram illustrating one embodiment of a printing cartridge.

FIG. 25 depicts one embodiment of a printing cartridge 2500. The illustrated printing cartridge 2500 includes a casing 2502 and a print ribbon 2504. In one embodiment, the print ribbon 2504 may be a panelized print ribbon, as shown in FIG. 21. Alternatively, the print ribbon 2504 may be a monochromatic print ribbon or a polychromatic print ribbon different from the panelized print ribbon of FIG. 21.

The illustrated printing cartridge 2500 also includes a payoff spool 2506, a take-up spool 2508, and a nip roller 2510. The print ribbon 2504 may be advanced from the pay-off spool 2506 to the take-up spool 2508 by a cartridge drive (not shown). In one embodiment, the nip roller 2510 maintains the tension of the print ribbon 2504 that is between the pay-off spool 2506 and the nip roller 2510. In this manner, the nip roller 2510 may maintain the tension of the print ribbon 2504 that is pulled out from the print cartridge 2500 (e.g. by the extension arms 2212) during a printing operation. The illustrated printing cartridge 2500 also includes two roller recesses 2512, one recess 2512 for each of the ribbon rollers 2212 (or 2412). In another embodiment, the printing cartridge 2500 also may include a radio frequency identifier (RFID). As described above, the verification module 308 may verify the source of the printing cartridge 2500.

Figure 26:
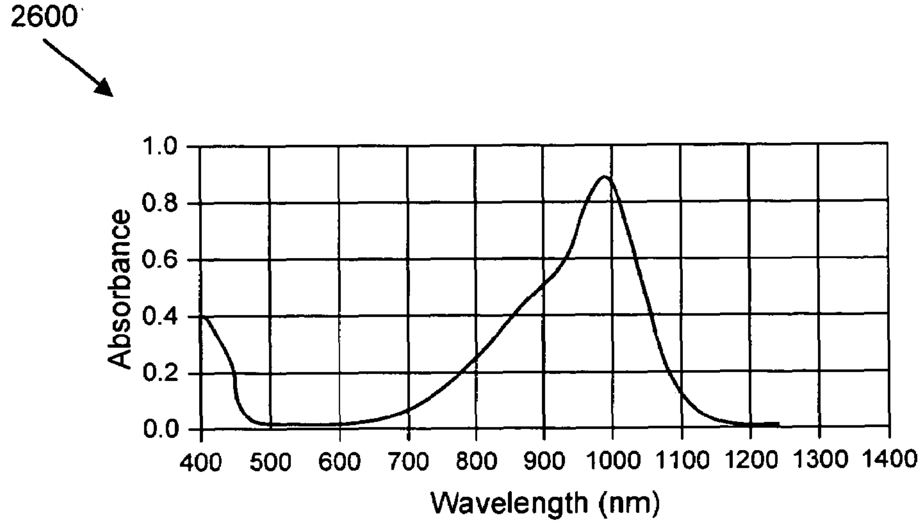
FIG. 26 is a schematic graphical representation illustrating one embodiment of absorbance for an infrared absorbent as a function of wavelength of an incident infrared signal.

FIG. 26 depicts one embodiment of a graph 2600 of absorbance of an exemplary IR absorbent as a function of the wavelength of an IR laser signal. As described above, a dye mixture may be doped with a small amount of IR absorbent, which may be available in either a powder or liquid form.

The graph 2600 shows that absorbance of an exemplary IR absorbent in response to application of an incident IR laser signal. The maximum absorbance of the exemplary IR absorbent is at approximately 990 nm, which is within the near IR spectrum.

Although certain embodiments described above refer to specific structures and/or functions, other embodiments may be implemented that make use of other structures and/or functions that also may offer advantages. For example, various components of the described printing systems and apparatuses may be located in a single location or in disparate locations. The components may communicate with one another, with a user, with a database, and so forth, via the internet, a local area network (LAN), a wireless area network (WAN), or another type of communication channel.

Furthermore, the types of objects on which an image may be printed are not limited to the objects listed above. The printing systems and apparatuses, in various embodiments, may print images on all types of objects of various sizes including, but not limited to, sports equipment and paraphernalia, ski and snowboard equipment, housewares, glasswares, clothing items, leather products, wood products, plastic products, ceramic products, and many other types of objects. When printing on clothing, a laser print head may be used for cotton or polyester based fabrics (using low wattage for cotton to avoid fabric burns). Similarly, a thermal print head may be used for polyester based fabrics and other more heat-resistant fabrics. When printing on glasswares or other substantially transparent objects, the image may be printed as a mirror image on a back side of the object.

Furthermore, printing systems similar, although not necessarily identical, to the automated kiosk described above may be implemented to allow a user or operator to be more or less involved in the object handling and/or printing operations. For example, a standalone printing apparatus may be operated by an operator that orients and places an object in a printing station and, after the image is printing, removes the object to deliver it to a customer. Other embodiments, may allow more or less interaction by a customer or an operator.

Furthermore, although several embodiments herein describe a laser print head, other types of print heads may be used to implement various embodiments of the printing system. For example, some embodiments may use a thermal print head. In particular, a flexible thermal print head may be used. One embodiment of a flexible thermal print head includes several individual resistive elements that may be individually energized, thereby transferring individual "dots" of ink from the print ribbon to the object. A printing system that uses a thermal print head, such as the flexible thermal print head, may use a print ribbon that does not include an IR absorbent applied to the dye carrier medium. Additionally, a resin may or may not be used. In certain embodiments, where a resin is not used, a receiving layer may or may not be used.

Furthermore, in certain embodiments, the laser print head maybe configured to use a split beam. The split beam may be facilitated through implementation of optics, polygons, mirrors, and so forth. Alternatively, split beam emissions may be facilitated through other technologies.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A printing apparatus to facilitate registration printing on a multi-dimensional surface, the apparatus comprising:

- an image module configured to store a digital representation of an image;
- a print module coupled to the image module, the print module configured to print the image on a multi-dimensional surface of an object; and
- an object registration module coupled to the print module, the object registration module configured to control a multi-dimensional registration of the multi-dimensional surface of the object in proximity to a print head in accordance with the image;
- a print ribbon cartridge coupled to a registration mount and controlled by the print module, the print ribbon cartridge having a print ribbon;
- an object holding device configured to hold an object having a print surface; and
- a registration device coupled to the registration mount and the object holding device, the registration device controlled by the object registration module and configured to move the registration mount and the object holding device to orient the print ribbon cartridge and the object holding device in a print position with respect to a print head;
- wherein the ribbon extension device comprises a radial extension arm coupled to a ribbon roller, the radial extension arm configured to extend the ribbon roller away from the print ribbon cartridge along a substantially radial path;
- comprising a sensor to sense a mark on the object to facilitate orientation of the object.

2. The apparatus of claim 1, further comprising a print head registration module coupled to the print module, the print head registration module configured to control a multi-dimensional registration of a print head in proximity to the multi-dimensional surface in accordance with the image.

3. The apparatus of claim 2, further comprising a media control module coupled to the print module, the media control module configured to control a multi-dimensional registration of a print media in proximity to at least one of the print head and the multi-dimensional surface of the object.

4. The apparatus of claim 1, further comprising an image concatenation module coupled to the print module, the image concatenation module configured to concatenate the digital representation of the image with a second digital representation of a second image.

5. The apparatus of claim 1, further comprising an orientation module coupled to the object registration module, the orientation module configured to orient the object with respect to a physical characteristic of the object.

6. The apparatus of claim 1, further comprising a station control module coupled to the object registration module, the station control module configured to move the object between a printing station and another object handling station.

7. The apparatus of claim 1, further comprising at least one of:

a verification module coupled to the object registration module, the verification module configured to identify a verification mark applied to the object;

a sensor module coupled to the object registration module, the sensor module configured to control a sensor to facilitate handling of the object; and a delivery module coupled to the object registration module, the delivery module configured to deliver the object to a delivery station after the image is printed on the multi-dimensional surface of the object.

8. The apparatus of claim 1, further comprising:

a print ribbon controlled by the print module, the print ribbon comprising:

a dye carrier medium;

a dye applied to the dye carrier medium;

a resin applied to the dye carrier medium, the resin to facilitate adhesion of the dye to a printing surface; and an infrared absorbent applied to the dye carrier medium, the infrared absorbent reactive to an infrared source.

9. The apparatus of claim 8, wherein the infrared absorbent absorbs heat in response to an infrared signal from the infrared source, the infrared signal within an infrared wavelength range of approximately between 750 nm and 1 mm.

10. The apparatus of claim 8, wherein the resin facilitates protection of the dye in response to application of the dye to an object.

11. The apparatus of claim 8, wherein the dye comprises one of a plurality of dyes applied to the dye carrier medium, each of the plurality of dyes applied to alternating panels of the dye carrier medium.

12. The apparatus of claim 8, wherein the dye is a single dye monochromatically applied to the dye carrier medium.

13. The apparatus of claim 8, wherein the infrared absorbent comprises less than approximately two percent of a total dye weight.

14. The apparatus of claim 8, wherein the infrared absorbent comprises approximately between one and ten percent of a solid weight of the dye.

15. The apparatus of claim 8, wherein the infrared absorbent comprises approximately between four and eight percent of a solid weight of the dye.

16. The apparatus of claim 1, further comprising:

a print ribbon controlled by the print module, the print ribbon comprising:

a dye carrier medium;

a dye applied to the dye carrier medium; and an infrared absorbent applied to the dye carrier medium, the infrared absorbent reactive to an infrared signal from an infrared laser, the infrared signal having a wavelength of at least approximately 850 nm.

17. The apparatus of claim 16, wherein the infrared absorbent comprises an absorbance of approximately 0.5 AU within a wavelength range of approximately between 900 nm and 1050 nm.

18. The apparatus of claim 16, wherein the infrared absorbent comprises a maximum absorbance within a wavelength range of approximately between 975 nm and 1000 nm.

19. The apparatus of claim 1, wherein the print head comprises a laser print head configured to emit a laser signal having approximately an infrared wavelength.

20. The apparatus of claim 19, further comprising a laser intensity module configured to control an intensity of the laser signal from the laser print head.

21. The apparatus of claim 19, further comprising a laser time module configured to control a duration of the laser signal from the laser print head.

22. The apparatus of claim 1, further comprising a ribbon extension device to extend the print ribbon away from the print ribbon cartridge and to orient the print ribbon approximately in contact with the print surface of the object.

23. The apparatus of claim 22, wherein the ribbon extension device comprises a linear extension arm coupled to a ribbon roller, the linear extension arm configured to extend the ribbon roller away from the print ribbon cartridge along a substantially linear path.

24. The apparatus of claim 22, wherein the ribbon extension device comprises a radial extension arm coupled to a ribbon roller, the radial extension arm configured to extend the ribbon roller away from the print ribbon cartridge along a substantially radial path.

25. The apparatus of claim 1, further comprising:

a dye-sublimation printing module to print on a multi-dimensional surface, the module comprising:

a print ribbon cartridge having a print ribbon with a dye applied thereto; and a print head configured to directly transfer the dye from the print ribbon to a multi-dimensional surface of an object.

26. The apparatus of claim 25, further comprising an infrared absorbent applied to the print ribbon.

27. The apparatus of claim 26, further comprising an infrared laser configured to apply an infrared signal to the print ribbon.

28. The apparatus of claim 25, further comprising a resin applied to the print ribbon.

29. The apparatus of claim 1, further comprising:

a print ribbon cartridge having a print ribbon with a dye applied thereto;

an infrared laser having a wavelength of at least approximately 850 nm;

an infrared absorbent applied to the print ribbon, the infrared absorbent reactive to the infrared laser, to transfer the dye directly from the print ribbon to a surface of an object in response to incidence of an infrared signal from the infrared laser on the print ribbon.

30. The apparatus of claim 29, wherein the printing system is configured to print the dye on the surface of a multi-dimensional object.

31. The apparatus of claim 29, wherein the printing system is configured to print the dye on a sheet of paper.

32. The apparatus of claim 29, further comprising a resin applied to the print ribbon.

33. The apparatus of claim 29, wherein the surface of the object comprises a receiving layer applied to the surface of the object.

34. The apparatus of claim 1, further comprising:

an automated kiosk for registration printing and vending a multi-dimensional object, the automated kiosk comprising:

a selection module configured to allow a customer to select a multi-dimensional object for purchase;

a print module configured to print an image on a surface of the object; and a registration module configured to control a multi-dimensional registration of at least one of a print head and the multi-dimensional object in proximity to the other in accordance with the image.

35. The apparatus of claim 34, further comprising at least one of:

a kiosk lockout module configured to lock the automated kiosk system in an inoperable state in response to a lockout control signal;

an image input module configured to access an image file that is stored remotely from the automated kiosk system;

an image load module configured to access an image file that is stored locally on the automated kiosk system;

a text input module configured to recognize text input from a user and include the text input in the image in response to an insertion operation; and a display module configured to display the image to a user for verification before the image is printed on the surface.

36. An automated kiosk for registration printing and vending a multi-dimensional object, the automated kiosk comprising:

a selection module configured to allow a customer to select a multi-dimensional object for purchase;

a print module configured to print an image on a surface of the object; and a registration module configured to control a multi-dimensional registration of at least one of a print head and the multi-dimensional object in proximity to the other in accordance with the image;

a print ribbon cartridge coupled to a registration mount and controlled by the print module, the print ribbon cartridge having a print ribbon;

an object holding device configured to hold an object having a print surface; and a registration device coupled to the registration mount and the object holding device, the registration device controlled by the object registration module and configured to move the registration mount and the object holding device to orient the print ribbon cartridge and the object holding device in a print position with respect to a print head;

wherein the ribbon extension device comprises a radial extension arm coupled to a ribbon roller, the radial extension arm configured to extend the ribbon roller away from the print ribbon cartridge along a substantially radial path;

comprising a sensor to sense a mark on the object to facilitate orientation of the object.

* * * * *

UNITED STATES PATENT AND TRADEMARK OFFICE

CERTIFICATE OF CORRECTION

PATENT NO. : 7,407,250 B2 
APPLICATION NO. : 11/061334
DATED : August 5, 2008
INVENTOR(S) : Mark R. Jones et al.

It is certified that error appears in the above-identified patent and that said Letters Patent is hereby corrected as shown below:

Column 1, Line 10
"APPARATUS, SYSTEM, AND METHOF" ---should read --APPARATUS, SYSTEM, AND METHOD--

Column 1, Line 45
"Additionally, convention printing" ---should read --Additionally, conventional printing--

Column 5, Line 22
"front view one" ---should read --front view of one--

Column 7, Line 3
"maybe configured" ---should read --may be configured--

Column 9, Line 4
"can be employ" ---should read --can employ--

Column 10, Line 43
"maybe used to load" ---should read --may be used to load--

Column 11, Line 14
"maybe configured to" ---should read --may be configured to--

Column 12, Line 43
"employing and expansion clamp" ---should read --employing an expansion clamp--

UNITED STATES PATENT AND TRADEMARK OFFICE

CERTIFICATE OF CORRECTION

PATENT NO. : 7,407,250 B2 
APPLICATION NO. : 11/061334
DATED : August 5, 2008
INVENTOR(S) : Mark R. Jones et al.

It is certified that error appears in the above-identified patent and that said Letters Patent is hereby corrected as shown below:

Column 16, Line 59
"devices maybe employed" ---should read --devices may be employed--

Column 17, Line 9
"maybe space approximately" ---should read --may be spaced approximately--

Column 17, Line 11
"In alternative embodiment" ---should read --In an alternative embodiment--

Signed and Sealed this

Seventh Day of October, 2008

JON W. DUDAS
*Director of the United States Patent and Trademark Office*